United States Patent
Cha et al.

(10) Patent No.: US 12,315,238 B2
(45) Date of Patent: May 27, 2025

(54) COMPUTER-IMPLEMENTED ARRANGEMENTS FOR PROCESSING IMAGE HAVING ARTICLE OF INTEREST

(71) Applicant: UNIVERSITY OF MANITOBA, Winnipeg (CA)

(72) Inventors: Young Jin Cha, Winnipeg (CA); Dongho Kang, Winnipeg (CA)

(73) Assignee: University of Manitoba, Winnipeg (CA)

( * ) Notice: Subject to any disclaimer, the term of this patent is extended or adjusted under 35 U.S.C. 154(b) by 458 days.

(21) Appl. No.: 17/735,507

(22) Filed: May 3, 2022

(65) Prior Publication Data

US 2022/0366682 A1 Nov. 17, 2022

Related U.S. Application Data

(60) Provisional application No. 63/183,805, filed on May 4, 2021.

(51) Int. Cl.
| | |
|---|---|
| *G06V 10/82* | (2022.01) |
| *G06T 7/00* | (2017.01) |
| *G06V 10/26* | (2022.01) |
| *G06V 10/77* | (2022.01) |

(Continued)

(52) U.S. Cl.
CPC ............ *G06V 10/82* (2022.01); *G06T 7/0002* (2013.01); *G06V 10/26* (2022.01); *G06V 10/771* (2022.01); *G06V 10/7715* (2022.01); *G06V 10/80* (2022.01); *G06T 2207/20016* (2013.01);

(Continued)

(58) Field of Classification Search
None
See application file for complete search history.

(56) References Cited

U.S. PATENT DOCUMENTS

| | | | |
|---|---|---|---|
| 2018/0173571 A1* | 6/2018 | Huang | G06F 9/5044 |
| 2022/0122267 A1* | 4/2022 | Sheshkus | G06T 7/12 |

OTHER PUBLICATIONS

W. Choi and Y.-J. Cha, "SDDNet: Real-Time Crack Segmentation," in IEEE Transactions on Industrial Electronics, vol. 67, No. 9, pp. 8016-8025, Sep. 2020, doi: 10.1109/TIE.2019.2945265. (Year: 2019).*

(Continued)

*Primary Examiner* — Mark R Milia
(74) *Attorney, Agent, or Firm* — Ryan W. Dupuis; Michael R. Williams; Ade & Company Inc.

(57) ABSTRACT

A computer-implemented method for analyzing an image to detect an article of interest (AOI) comprises processing the image using a machine learning algorithm configured to detect the AOI and comprising a convolutional neural network (CNN); and displaying the image with location of the AOI being indicated if determined to be present. The CNN comprises an input module configured to receive the image and comprising at least one convolutional layer, batch normalization and a nonlinear activation function; an encoder thereafter and configured to extract features indicative of a present AOI to form a feature map; a decoder thereafter and configured to discard features from the feature map that are not associated with the present AOI and to revert the feature map to a size matching an initial image size; and a concatenation module configured to link outputs of the input module, the encoder and the decoder for subsequent segmentation.

21 Claims, 8 Drawing Sheets

(51) Int. Cl.
  *G06V 10/771*    (2022.01)
  *G06V 10/80*     (2022.01)
(52) U.S. Cl.
  CPC .............. *G06T 2207/20081* (2013.01); *G06T 2207/20084* (2013.01)

(56) References Cited

OTHER PUBLICATIONS

Soham Chattopadhyay and Hritam Basak,2020 multiscaleattentionunetmsaunet,"Multi-scale Attention U-Net (MsAUNet): A Modified U-Net Architecture for Scene Segmentation", url={https://arxiv.org/abs/2009.06911} (Year: 2020).*

T. Akilan, Q. J. Wu, A. Safaei, J. Huo and Y. Yang, "A 3D CNN-LSTM-Based Image-to-Image Foreground Segmentation," in IEEE Transactions on Intelligent Transportation Systems, vol. 21, No. 3, pp. 959-971, Mar. 2020, doi: 10.1109/TITS.2019.2900426. (Year: 2020).*

* cited by examiner

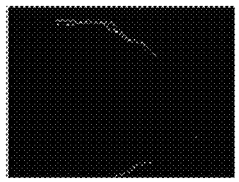
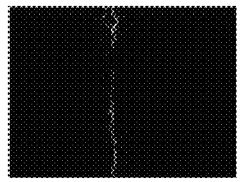
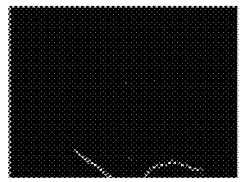
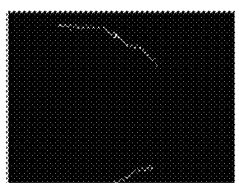
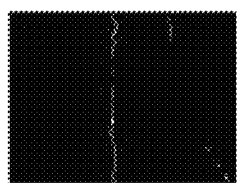
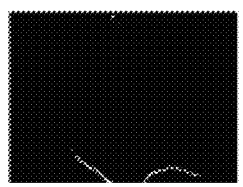
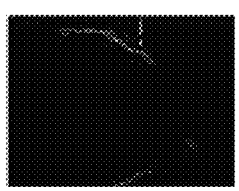
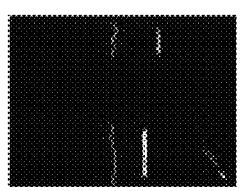
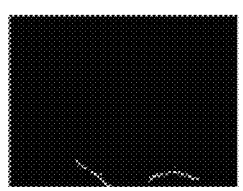
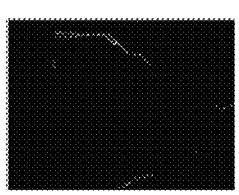
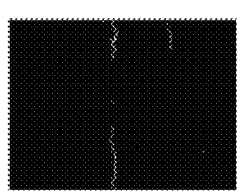
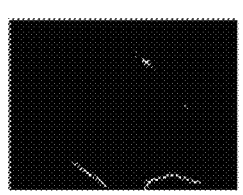
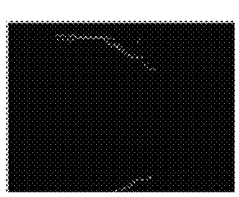
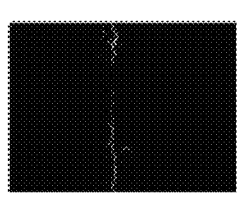
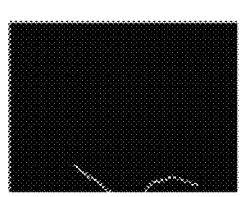
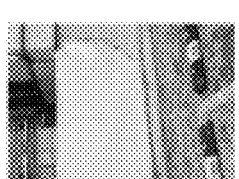
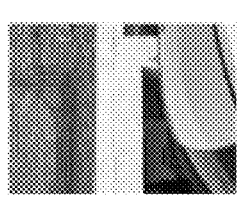
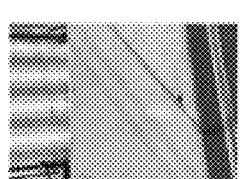
FIG. 11A  FIG. 11B  FIG. 11C

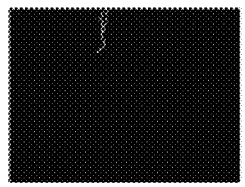
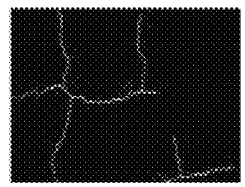
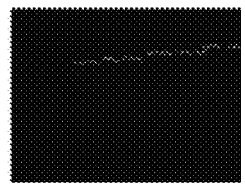
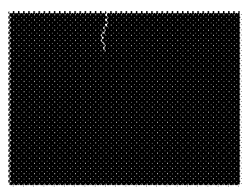
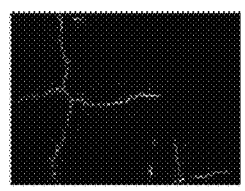
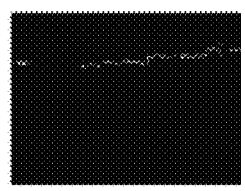
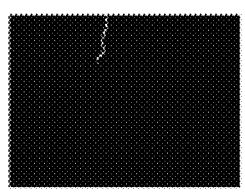
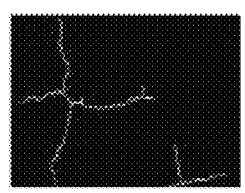
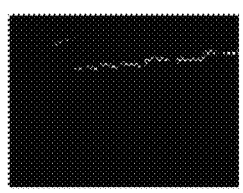
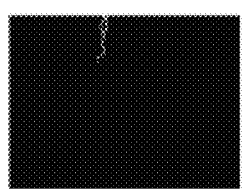
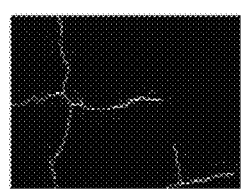
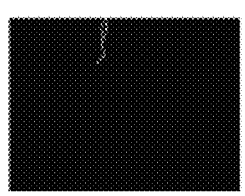
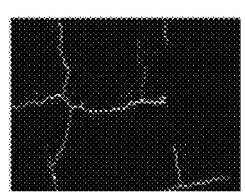
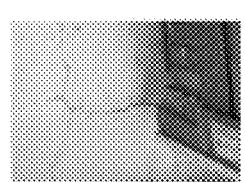
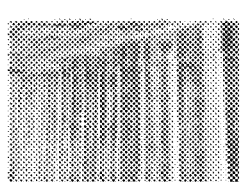
FIG. 11D
FIG. 11E
FIG. 11F

COMPUTER-IMPLEMENTED ARRANGEMENTS FOR PROCESSING IMAGE HAVING ARTICLE OF INTEREST

This application claims the benefit under 35 U.S.C. 119(e) of U.S. Provisional Application Ser. No. 63/183,805 filed May 4, 2021, which is incorporated by reference herein.

FIELD OF THE INVENTION

The present invention relates generally to computer-implemented arrangements for processing an image having an article of interest therein, including detecting an article of interest in an image, such as a defect in a surface, for example a crack; for extracting features from an image to detect an article of interest; and for processing a feature map of an image to detect an article of interest, and more particularly to such computer-implemented arrangements comprising a convolutional neural network, an attention-based encoder module and an attention-based decoder module, respectively.

BACKGROUND

Deep learning-based approaches were introduced to overcome the limitations of the traditional image processing-based damage detection approaches in recent years. Cha et al., (2017) pioneered the detection of structural damage using deep a convolutional neural network (CNN). They designed a unique CNN, and it was trained and tested to detect concrete cracks in the various image conditions that have real and uncontrolled lighting conditions including blurry and shadowed. For practical applications, the network has been examined using the images coming from an unmanned aerial vehicle (UAV) for concrete crack detection (Kang & Cha 2018). The network adopted a sliding window technique to localize the detected cracks, but this technique has heavy computational cost, and defining the proper size of the sliding window is another issue by considering camera and lens properties, camera and object distance, and size of cracks. Instead of the sliding window approach, deep learning-based object detection algorithms were applied for damage detection and localization (Cha et al., 2018; Xue & Li 2018). This faster region-based convolutional neural network (Faster R-CNN) proposes various sizes of bounding boxes to detect and localize different sizes of damage. The network uses the same base network for detection and localization; therefore, it is faster than the other types of localization methods (e.g., sliding window technique) and became the mainstream in the deep learning-based multiple types of damage detection problems (Maeda et al., 2018; Beckman et al., 2019; Deng et al., 2020).

Localization of structural damage with bounding boxes is not enough for damage quantification. Specifically, it is too coarse to use bounding boxes or sliding window to measure the thickness and length of detected concrete cracks. In the medical imaging field, U-net was suggested as deep learning-based pixel-level object segmentation (Ronneberger et al., 2015). U-net has various versions, but it is mostly composed of an encoder for feature extraction and a decoder to reconstruct the extracted/condensed feature to the original input image size. Similarly, pixel-level object segmentation methods have been applied to crack segmentation. For example, Zhang et al., (2017) developed CrackNet for asphalt crack segmentation from laser imaging. The network was tested two types of asphalt, hot mix, asphalt and warm mix asphalt, and achieved the 89% F1 score. However, this method was only applied to pure asphalt surfaces without any complex objects or background scenes.

There are numerous similar studies in this crack segmentation problem. From extensive literature reviews, there are at least five shortcoming of existing arrangements that may overcome or improved upon:

1) Although monitoring pavements without considering complex scenes may not constitute a serious problem, detecting structural damage such as concrete cracks is a major limitation if the network cannot detect only cracks in the complex scenes since many structures are located within various different visual scenes. Many researchers worldwide have conducted pixel-level detection of cracks and reported results as shown in Table 1. Only SDDNet (Choi and Cha, 2019) and NausNet (Bang et al., 2019) considered cracks in the complex scenes.

2) Another limitation is that most existing studies did not use proper evaluation metrics. Rather, most used accuracy, precision, recall and F1 score as presented in Table 1. However, accuracy is not proper for this crack evaluation because the size of the crack is usually too small compared to the background scenes; therefore, it usually provides a high score if the size of the crack is small. The precision and recall do not properly consider false positive and false negative detections and the F1 score can control these with parameter changes. The most reasonable and accurate evaluation metric at the moment is mean intersection over union (mIoU), which can consider false positive and negative accurately. Therefore, many studies in the areas of computer vision and deep learning also use mIoU as an evaluation metric and loss function to efficiently train their networks. However, for crack segmentation, only four networks, including DeepCrack (Liu et al., 2019b), DeepLabV3 (Ji et al., 2020), Resnet 150 (Bang et al., 2019) and SDDNet (Choi & Cha, 2019), used IoU as an evaluation metric.

3) Most of the existing studies used heavy networks or existing traditional networks that were originally developed for the segmentation of many objects; therefore, these networks need inherently and unnecessarily heavy computational cost due to their excessive learnable parameters. Therefore, it is impossible for real-time processing with relatively large input images or video frames (e.x., 1000× 500) that have 30 frames per second (FPS). Fast processing is an aspect of civil infrastructure monitoring due to its large scale and to process many images to inspect large-scale structures. It does not necessarily process in a real-time manner, but it reduces overall monitoring costs and provides fast updates of the structural states. For example, as presented in Table 1, DeepCrack used VGG16 as the backbone network. Liu et al. (2019a) used U-net (Ronneberger et al., 2015) architecture for concrete crack detection, Dung and Anh (2019) used fully convolution network (FCN) (Long et al., 2015), König et al. (2019) used Attention network (Oktay et al., 2018), Bang et al. (2019) used Resnet (He et al., 2016), Mei et al. (2020) used DenseNet (Huang et al., 2017), Ji et al. (2020) used DeepLabV3+(Chen et al., 2018), and Ren et al. (2020) used modified U-net which is called SegNet. Among all these networks, only SDDNet could do real-time processing with 36 FPS for 1024×512 RGB images.

4) Some studies used a too small number of training and testing data sets with small sizes of input images. This results in the high possibility of overfitting for the specific types of cracks with specific image conditions. For example, Liu et al. (2019a) used a total of 84 images of relatively small sizes (i.e., 512×512), and SDDNet also used only 40 images for testing with relatively large input image (1024×

512). Further, most of the studies used very small testing input image sizes which are all below 1000×500 except those conducted by Bang et al. (2019) and Choi and Cha (2020). Testing input image of small sizes also has the possibility of overfitting to specific types of cracks. It is also not efficient to monitor large-scale civil infrastructure, and it is also very limited in terms of detecting thin cracks in a relatively long distance of camera and object.

5) There are some unignorable errors in publicly available ground truth data. For example, the authors of DeepCrack (Liu et al., 2019b) thankfully shared their train and test set for benchmark purposes. However, Benz et al. (2019) pointed out that the DeepCrack dataset has approximately 3 pixels error in the ground truth of training and testing datasets. Ren et al. (2020) also shared their own crack dataset, but some of the ground truth images in the dataset have more than 3 pixels error and the images only depict pure concrete surfaces. For example, in FIGS. 1A-1D, there are four images cropped from the datasets, and there are severe errors in the labeling of the crack pixels. The black pixels in each image are the pixels that are related to actual cracks, but the black pixels are not accurately labeled, and some pixels related to intact concrete are labeled as cracks, as indicated by the differently shaded region adjacent the black crack and indicated by 'Red' in each figure. Poor labeling causes poor performance of the trained network because the network cannot properly learn which pixels are the actual pixels of cracks. These fundamental errors occurred in at least 30% of the ground truth images.

SUMMARY OF THE INVENTION

It is an aspect of the invention to provide a new unique computer-implemented network with an improved/increased data set and performance to resolve the above-described shortcomings which are particularly observed in pixel-level crack detection problems having complex scenes.

According to an aspect of the invention there is provided a computer-implemented method for analyzing an image of a surface to detect a defect in the surface, comprising:
  receiving the image of the surface having an initial size;
  processing the image using a machine learning algorithm configured to detect the defect, wherein the machine learning algorithm comprises a convolutional neural network;
  and displaying the image with location of the defect being indicated if determined to be present by the convolutional neural network;
  wherein the convolutional neural network comprises:
    an input module configured to receive the image, wherein the input module comprises at least one convolutional layer, batch normalization and a nonlinear activation function;
    an encoder module after the input module and configured to extract features indicative of a present defect to form a feature map;
    a decoder module after the encoder module and configured to discard features from the feature map that are not associated with the present defect and to revert the feature map to a size matching the initial size of the image; and
    a concatenation module configured to link outputs of the input module, the encoder module and the decoder module for subsequent segmentation.

In the illustrated arrangement, the at least one convolutional layer comprises a preliminary convolutional layer configured to receive the image.

In the illustrated arrangement, the at least one convolutional layer comprises a plurality of consecutive convolutional layers configured to provide an output for batch normalization of the input module.

In the illustrated arrangement, the encoder module is repeatedly executed such that the output thereof is an output of multiple consecutive iterations of the encoder module.

In the illustrated arrangement, the decoder module comprises an attention-based decoder submodule configured to discard features from the feature map that are not associated with the present defect and an upsampling submodule thereafter configured to revert the feature map to a size matching the initial size of the image, wherein the attention-based decoder submodule is executed fewer than four times.

In the illustrated arrangement, the upsampling submodule is configured to perform coarse upsampling and fine upsampling in parallel, wherein fine upsampling and coarse upsampling are arranged to increase a size of the feature map by different multiplicative factors, wherein the multiplicative factor of coarse upsampling is greater than (i) the multiplicative factor of fine upsampling and (ii) two.

Typically, the multiplicative factor of fine upsampling is two.

In the illustrated arrangement, fine upsampling is repeated.

In the illustrated arrangement, coarse upsampling is performed once for every iteration of the upsampling module.

In the illustrated arrangement, the upsampling submodule of the decoder module additionally receives, as input, an output of the encoder module.

In the illustrated arrangement, the convolutional neural network further includes a max pooling module intermediate the encoder module and the decoder module.

According to another aspect of the invention there is provided a computer-implemented method for extracting features from an image to detect an article of interest, comprising:
  receiving the image after pre-processing thereof by at least one of (i) one or more consecutive convolutional operators, (ii) batch normalization and (iii) a nonlinear activation function;
  processing the pre-processed image by an encoder module to extract features representative of the article of interest, wherein the encoder module comprises a series of operations comprising pointwise convolutions, depthwise convolutions, batch normalizations, activation functions and squeeze-and-excitation-based attention operators;
  wherein the encoder module is iterated using different subsets of the series of operations, wherein each subset comprises selected ones of the operations.

In the illustrated arrangement, cumulative stride of pointwise and depthwise convolutions is less than 16.

In the illustrated arrangement, strides of pointwise and depthwise convolutions are no greater than two.

In the illustrated arrangement, the activation functions include nonlinear activation functions.

In the illustrated arrangement, the nonlinear activation functions comprise learnable Swish activation functions.

In the illustrated arrangement, the learnable Swish activation functions have a learnable parameter which is updated for every subsequent consecutive iteration of the encoder module during training.

Generally speaking, when the learnable parameter is updated, it is increased in magnitude.

In the illustrated arrangement, in every subsequent iteration, the learnable parameter is increased by an additive value, which initially is half of an initial value of the learnable parameter in an initial one of the iterations of the encoder module, and which is doubled for every subsequent iteration.

In the illustrated arrangement, the activation functions of one or more initial consecutive iterations of the encoder module comprise bilinear activation functions, and subsequent consecutive iterations, which are greater in number than the initial consecutive iterations, use nonlinear activation functions.

In the illustrated arrangement, the series of operations comprises:
- a first operation comprising a pointwise convolution, batch normalization thereafter and a prescribed bilinear activation function after the batch normalization;
- a second operation comprising a first depthwise convolution, batch normalization thereafter and the bilinear activation function after the batch normalization;
- a third operation which is the same as the first operation;
- a fourth operation comprising a second depthwise convolution and batch normalization thereafter, wherein the second depthwise convolution has a different stride than the first depthwise convolution;
- a fifth operation comprising global average pooling;
- a sixth operation comprising a linear function including a linear transpose and a rectified linear unit activation function thereafter;
- a seventh operation comprising a linear function including a linear transpose and a bi-linearity activation function thereafter;
- an eighth operation comprising a squeeze-and-excitation-based attention operator;
- a ninth operation comprising multiplication of an output after the fourth operation and an output after the eighth operation;
- a tenth operation comprising a linear activation function, at least one pointwise convolution thereafter;
- an eleventh operation comprising upsampling and concatenation thereafter; and
- a twelfth operation comprising a pointwise convolution and batch normalization thereafter.

In the illustrated arrangement, the at least one pointwise convolution of the tenth operation comprises a plurality of consecutive pointwise convolutions.

In the illustrated arrangement, a first subset of the series of operations comprises the third, fourth and tenth operations; a second subset of the series of operations comprises the third operation through the tenth operation; and a third subset of the series of operations comprises the first operation through the twelfth operation.

In the illustrated arrangement, the linear activation function of the operations of a plurality of initial iterations of the encoder module comprises a rectified linear unit activation function and the linear activation function of the operation of a plurality of subsequent iterations of the encoder module comprises a Swish activation function.

In the illustrated arrangement, an output of a final one of the iterations using the rectified linear unit activation function and an output of a final one of the iterations using the Swish activation function are extracted for use in further processing.

In the illustrated arrangement, the second subset of the series of operations is not consecutively repeated.

In the illustrated arrangement, the first subset of the series of operations is consecutively repeated.

In the illustrated arrangement, the stride of the depthwise convolutions is either one or two.

According to yet another aspect of the invention there is provided a computer-implemented method for processing a feature map of an image to detect an article of interest, comprising:
- processing the feature map using a decoder module, wherein the decoder module comprises an attention-based decoder submodule configured to discard features from the feature map that are not associated with the present defect and an upsampling submodule thereafter configured to revert the feature map to a size matching an initial size of the image.

In the illustrated arrangement, the attention-based decoder submodule is iterated fewer than four times.

In the illustrated arrangement, the upsampling submodule is configured to perform coarse upsampling and fine upsampling in parallel, wherein fine upsampling and coarse upsampling are arranged to increase a size of the feature map by different multiplicative factors, wherein the multiplicative factor of coarse upsampling is greater than (i) the multiplicative factor of fine upsampling and (ii) two.

In the illustrated arrangement, fine upsampling is repeated.

In the illustrated arrangement, coarse upsampling is performed once.

In the illustrated arrangement, the upsampling submodule additionally receives the feature map as input.

In the illustrated arrangement, when the method further includes a step of receiving the feature map and an intermediate feature map product yielded by one or more initial iterations of an encoder module which is configured to process the image to form the feature map, the attention-based decoder submodule comprises:
- a first operation comprising a convolution and batch normalization thereafter;
- a second operation comprising parallel pointwise convolutions, only one of which is followed by batch normalization, whereby three intermediate maps are formed, wherein the intermediate maps are three-dimensional and wherein two of the intermediate maps are derived from the pointwise convolution followed by batch normalization;
- a third operation configured to convert the three-dimensional intermediate maps to reduced maps having two dimensions, wherein the two intermediate maps derived from the pointwise convolution followed by batch normalization have transposed dimensions;
- a fourth operation configured to (i) multiply the two intermediate maps derived from the pointwise convolution followed by batch normalization so as to form a first attention map, and (ii) filtering the first attention map with a softmax operator to form a second attention map; and
- a fifth operation configured to multiply the second attention map and the intermediate map derived from the pointwise convolution that is not followed by batch normalization so as to form an intermediate product.

Generally speaking, the convolution of the first operation has dimensions $3 \times 3 \times D$ where D is a depth of the feature map.

In the illustrated arrangement, the attention-based decoder submodule further comprises:
- a sixth operation configured to concatenate the intermediate product and the intermediate feature map product to form a concatenated product;
- a seventh operation performed on the concatenated product and comprising a pointwise convolution and batch normalization thereafter; and wherein the seventh operation further comprises dropout after batch normalization.

In the illustrated arrangement, the attention-based decoder submodule further comprises an eighth operation comprising a transposed convolution.

In the illustrated arrangement, the transposed convolution has a stride of two.

BRIEF DESCRIPTION OF THE DRAWINGS

The invention will now be described in conjunction with the accompanying drawings in which:

FIGS. 11A through 11F show, for comparison, experimental results of prior art networks and of STRNet applied to different images of cracks in complex scenes, each including a raw input image, ground truth (GT) data, an end result of Attention U-net, an end result of Deeplab V3+, an end result of MobileNetV3 S8, and an end result of STRNet.

In the drawings like characters of reference indicate corresponding parts in the different figures.

DETAILED DESCRIPTION

The accompanying figures illustrate computer-implemented arrangements for processing an image having an article of interest therein, including detecting an article of interest in an image, such as a defect in a surface, for example a crack; for extracting features from an image to detect an article of interest; and for processing a feature map of an image to detect an article of interest. The arrangement for detecting an article of interest in an image, which for convenient reference may be referred to hereinafter as STRNet, is particularly suited for application to images of defects in surfaces, and in particular cracks in concrete.

Figure 1A:
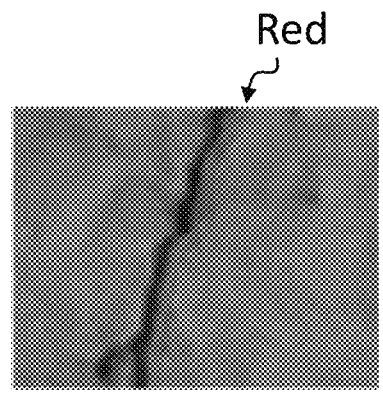
FIGS. 1A through 1D are examples of severe errors in a prior art database.
Figure 1B:
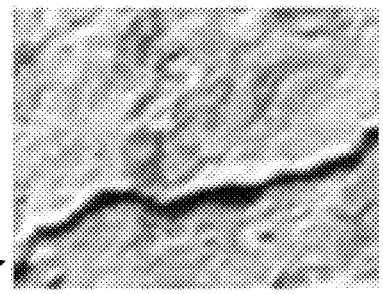
Figure 1C:
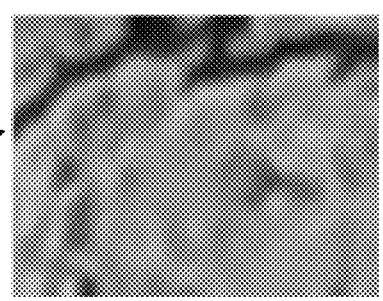
Figure 1D:
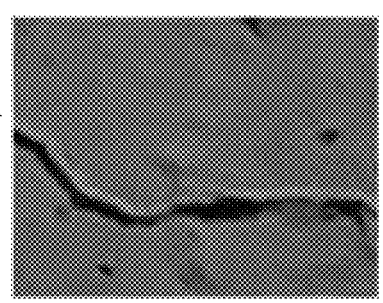
Figure 2:
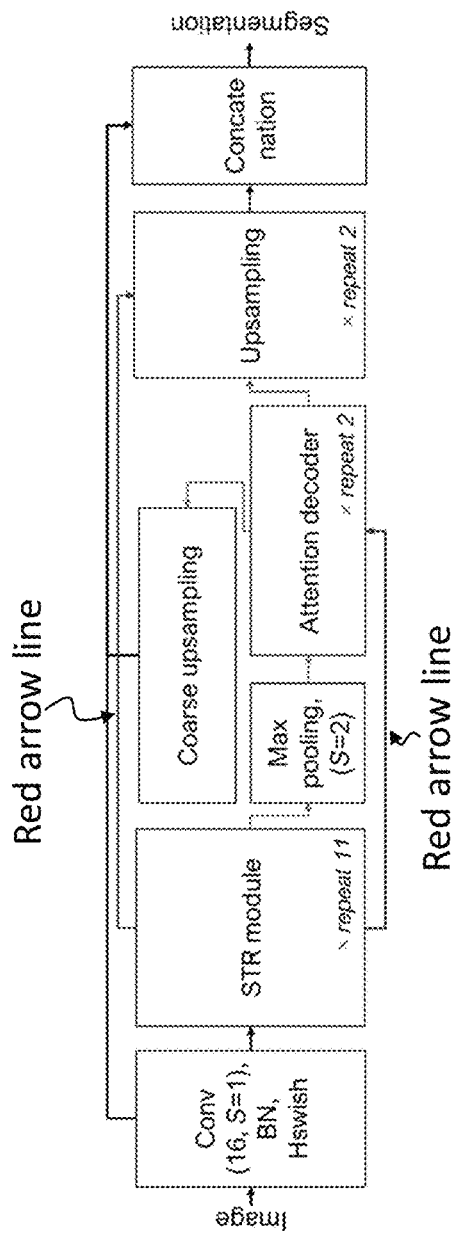
FIG. 2 is a schematic diagram of an overall architecture of an arrangement of method for analyzing an image of a surface to detect a defect in the surface, which may be referred to hereinafter as STRNet for convenient reference.

A novel architecture named STRNet of deep convolutional neural network is proposed to segment concrete cracks on complex scenes in pixel-level in a real-time manner (i.e., at least 30 FPS) with a testing input size of 1024×512 RGB images/videos. The STRNet is composed of a new STR module-based encoder, a new Attention decoder with coarse upsampling block, a traditional convolutional (Cony) operator, a learnable Swish nonlinear activation function (Ramachandran et al., 2017), and batch normalization (BN) to segment only cracks in complex scenes with real-time manner. The schematic view of the STRNet is shown in FIG. 2. In order to develop this high-performance network with low computational cost, many advanced networks were investigated to figure out their strengths and weaknesses. STRNet is newly designed and inspired by MobileNetV3 (Howard et al., 2019), HR-Net (Sun et al., 2019) and OCNet (Yuan & Wang, 2018).

STRNet processes an input image by 16 Cony filters with a size of 3×3×3 with stride ( ) 1, BN (Ioffe & Szegedy, 2015) and Hswish (Avenash & Viswanath, 2019; Howard et al., 2019) activation function with a skipped connection. The result of these processes in the first block of FIG. 2 is inputted to a newly designed STR module and final 'Concatenation block' as shown in FIG. 2. The STR module is repeated 11 times, and afterward, the feature map is fed into 'Max pooling' operator, and is then forwarded to the newly designed 'Attention decoder' and 'Upsampling' module. The result of Max pooling goes through the 'Attention decoder' two times, and the output is fed into 'Upsampling' and 'Coarse upsampling' modules. The outputs of the final upsampling and coarse upsampling modules are concatenated with the output of the first Cony block as shown in FIG. 2. The concatenated features are processed by pointwise convolution (PW) to match the output to the input image size for final pixel-level segmentation. The details of the newly developed modules and their roles are described further below.

Figure 3:
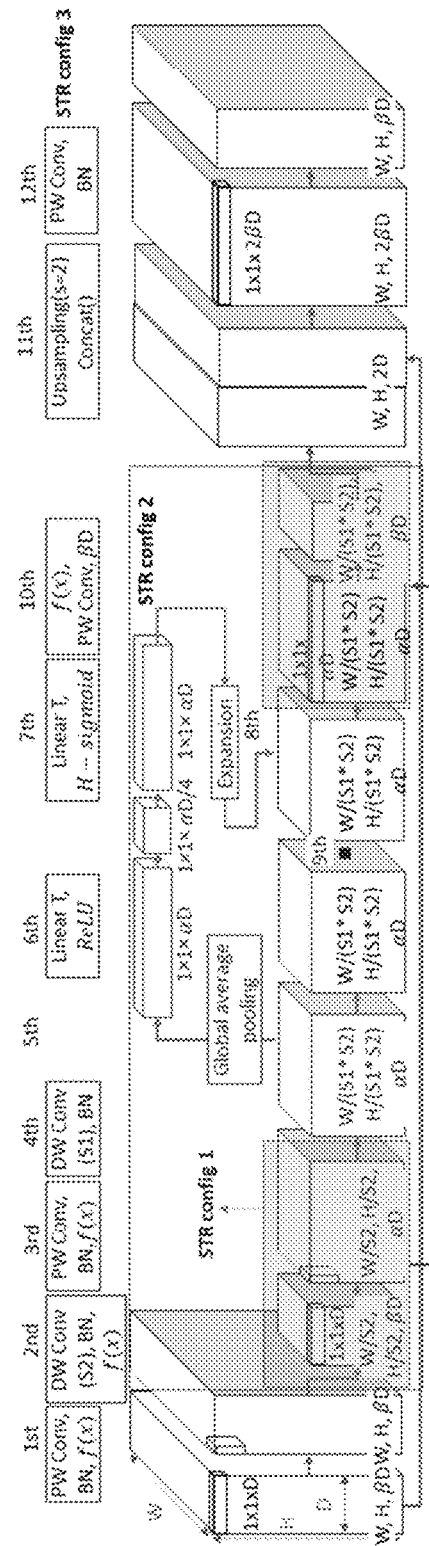
FIG. 3 is a schematic diagram showing the arrangement of FIG. 2 in more detail.

The STR module is newly developed to improve the segmentation accuracy by reducing the computational cost for real-time processing on the complex scenes. The STR module is composed of pointwise convolution (PW), depthwise convolution (DW), BN, Swish activation function, squeeze and extension-based attention module as shown in FIG. 3. STR module has three different configurations (i.e., "STR config 1", "STR config 2" and "STR config 3") as shown in FIG. 3. STR config 1 has simple processes of 3rd block, 4th block, and 10th block with PW, DW, BN, and rectified linear unit (ReLU) activation function, illustrated as the dark greenish block shown in FIG. 3. STR config 2 is combined with STR config 1 and squeeze and excitation-based attention (SEA) module (Hu et al., 2018) with ReLU illustrated as the yellowish block shown in FIG. 3. STR config 3 is the entire network of the STR module with blocks from 1st to 12th. STR module is repeated 11 times, and a different configuration is operated in each repeat as presented in Table 2 such that the configurations are repeated irregularly as shown in the right hand column of Table 2. All these arrays of configurations are new and unique with different DW convolution sizes, different stride sizes (S1, S2), with/without SEA module, ReLU/Swish activation function, and skipped connection. The "Connector" in Table 2 indicates the skipped connection with the red arrow line as shown in FIG. 2, which only happens with "yes". Therefore, the Connector is only used in the repeats in 3 and 11 to keep multi-level features.

Publicly available segmentation networks usually apply stride 16 or 32 to the feature map in an encoder module, which means that the extracted feature map size is reduced to 16 or 32 times smaller than the original input image size. However, these large spatial contractions of the extracted feature maps compared to the input size may cause the loss of features relevant or representative of the article of interest. This issue is found throughout extensive experimental studies to develop this unique network, although it might be only applicable to this unique crack segmentation problem.

Due to the nature of cracks with very long and thin shapes, a network may need a slightly larger feature map. Therefore, a stride of 8 (i.e., S1³) was used (as shown in Table 2 by three "2"), but this small stride causes the high computational cost through deep hidden layers of the proposed network. To resolve this issue, and to maintain representative features and real-time processing, a different STR configuration (i.e., configs 1 to 3) was used in each repeat as presented in Table 2. Through the STR configs 1 and 2, features were extracted by keeping its relatively large feature map, but these large feature maps have large computational costs compared to small feature maps through the deep layers of the network. Therefore, to reduce its feature map by keeping the representative features, STR config 3 was used, with squeeze and excitation-based attention operation.

The role of squeeze and excitation operation is to extract representative features. In order to squeeze the extracted feature map, global average pooling at the $5^{th}$ block is applied in STR configs 2 and 3. The global average pooling performs the average pooling operation about the entire W (input width) and H (input height) size in each feature channel, so the output feature map becomes $1\times1\times\alpha D$ at the $6^{th}$ block. The physical meaning of this global average pooling is the extraction of representative (i.e., mean) features from the extracted features. Here, $\alpha$ is given in Table 2, and D is 16 since traditional Cony was conducted 16 times, as shown in FIG. 2. This process is called squeeze process, and it extracts representative features while compressing information. This feature is fed into two linear functions (Linear T) (Paszke et al., 2017) with ReLU and H-Sigmoid (Courbariaux et al., 2015, Howard et al., 2019).

$$H - Sigmoid(x) = \frac{ReLu6(x+3)}{6} \quad (1)$$

where ReLu6 is an embedded activation function in Pytorch (Paszke et al., 2017). ReLu6 has a unique shape with a maximum output value (6) for all inputs greater than or equal to 6. The excitation process recovers the squeezed feature map to the original size by reproduction of the squeezed feature map ($1\times1\times\alpha D$). The H-Sigmoid expressed in Equation (1) provides the bi-linearity activation function. The output of DW from $4^{th}$ block is multiplied (■) by the output of excitation at $8^{th}$ block.

Another technical contribution of this STR module is the implementation of a non-linear activation function. Most recently, proposed networks in this area typically only use ReLU because of its simplicity in differential calculation for backpropagation and to reduce computational cost and automatic hibernation of unnecessary learnable parameters in the network. However, an objective is to develop a concise and efficient network by using a smaller number of hidden layers, meaning most of the assigned learnable parameters in each filter in each layer should be fully used to extract multiple levels of features for high performance of the pixel-level segmentation. Therefore, using ReLU is no longer a viable option for this concise and light objective specific network. This ReLU was used only for the first three STR module repetitions for the stable training process as presented in Table 2. After that, a learnable Swish nonlinear activation function (Ramachandran et al., 2017) was used to resolve this issue in the STR module.

$$swish(x) = x \cdot sigmoid(\beta x) \quad (2)$$

where $\beta$ is a learnable parameter of the Swish activation function. The major benefit of this learnable Swish activation function is that it can be converted from scaled linear ReLU to a non-linear function by changing the $\beta$ from 0 to $\infty$. Due to the dynamic shape of the activation function, this network is able to extract features more efficiently and precisely. However, it also may cause an unstable training process; therefore, as described, the first three repetitions of the STR module use ReLU. The result of PW convolution in the $10^{th}$ block in FIG. 2 is upsampled to the input feature size ($1^{st}$ block) of W and H. The input of the STR module and the upsampled result are densely concatenated to keep the different multi-level levels of features in the 11th block. This process recovers the loss of features from the 2 strides (S2) of DW convolution in the $2^{nd}$ block. After, the densely piled features are processed by PW convolution to restore the D channel value, which serves to facilitate the repetition of the STR module.

The role of traditional decoders in this pixel-level segmentation problem is to recover the size of the extracted feature map from well-designed encoders. However, the performance of the encoders is not usually high enough to achieve a very high level of segmentation as described hereinbefore. Therefore, there is disclosed a unique attention-based decoder to support the role of the STR encoder to screen wrongly extracted features in the encoding process. Initially, existing attention decoders (Vaswani et al., 2017; Yuan & Wang, 2018) were used, but due to their heavy computational cost, real-time processing was impossible. Therefore, a unique decoder was designed by configuration of Attention decoder, Upsampling and Coarse upsampling by using the attention operation minimally to reduce the heavy computational cost to keep its real-time processing performance as shown in FIG. 4.

Figure 4:
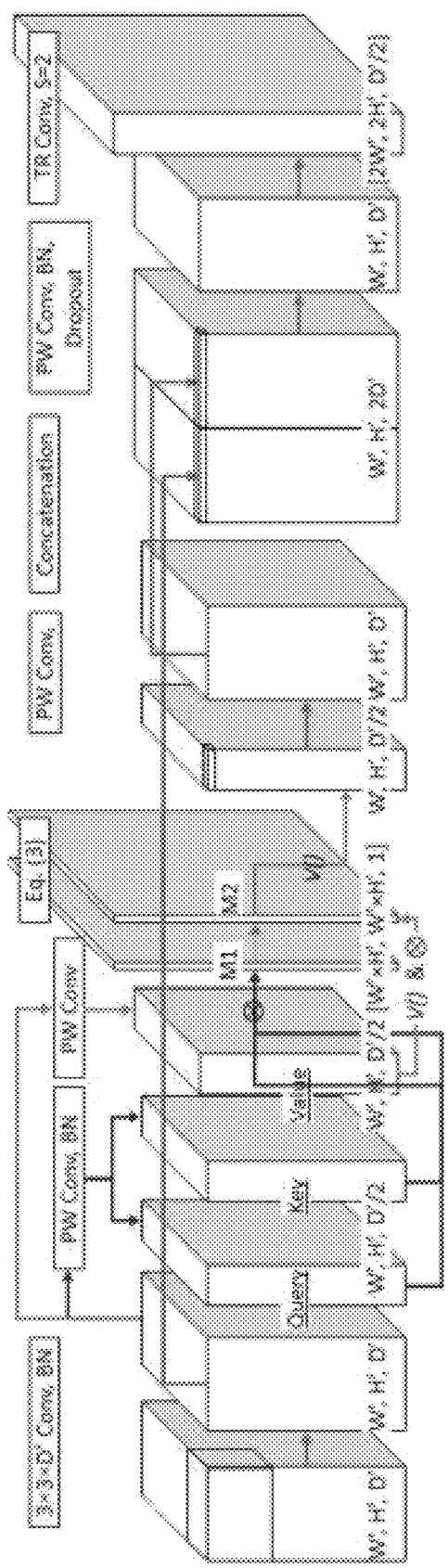
FIG. 4 is a schematic diagram of an arrangement of method for processing a feature map of an image to detect an article of interest, which may be referred to hereinafter as an attention decoder of STRNet for convenient reference.

The role of 'Attention decoder' shown in FIG. 4 is to screen wrongly extracted features from the STR encoder and to recover the reduced feature spatial size from STR module by keeping its unique features from the original input size. Usually, an attention decoder is repeated more than 4 times in publicly available networks (Oktay et al., 2018; Zeng et al., 2019). However, it was repeated only two times to reduce computational cost, and Upsampling and Coarse upsampling operators were used to supplement this reduced number of attention decoder repeat as shown in FIG. 2.

In FIG. 4, the first input size ([W', H', D']=[64,32,96]) is the final output of the encoder with the result of 2×2 max pooling. This input is applied to 3×3 convolution and BN as shown in FIG. 4. This result is processed by PW with/without BN and produces $$\text{Query}\left[\frac{D'}{2}, W', H'\right], \text{Key}\left[\frac{D'}{2}, W', H'\right] \text{ and Value}\left[\frac{D'}{2}, W', H'\right].$$

These maps are then reshaped using embedded function V( ) of Pytorch from 3-D to 2-D and resulted in $$\left[W' \times H', \frac{D'}{2}\right], \left[\frac{D'}{2}, W' \times H'\right], \text{ and } \left[W' \times H', \frac{D'}{2}\right],$$

respectively. The Query and Key are multiplied (symbolized as $\otimes$) and result in M1 attention map. The M1 attention map is filtered by Equation 3 and output M2. The reshaped Value is multiplied with the M2 attention map which is attention process.

$$M2 = softmax\left[\left(\frac{D'}{2}\right)^{-0.5} \times M1\right] \quad (3)$$

Figure 5:
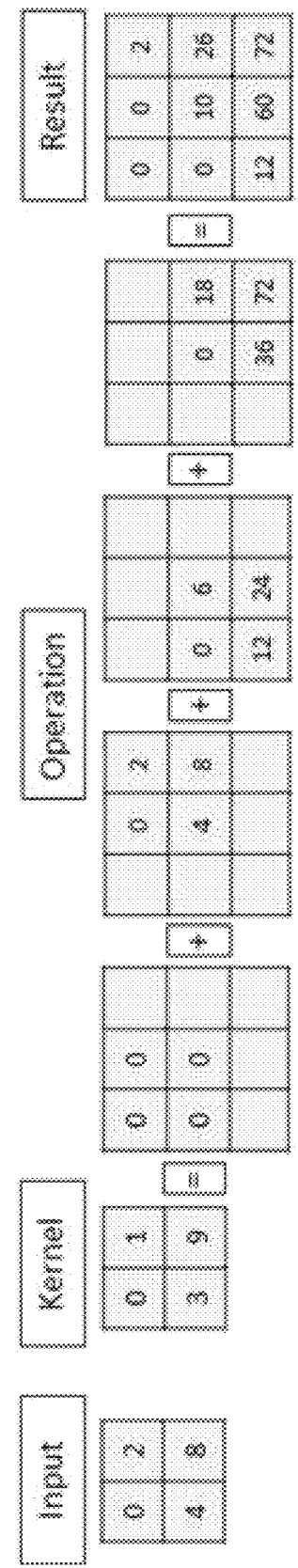
FIG. 5 shows an example of a transpose convolution procedure.

The object context produced by attention process and the output of first Cony operation from the first block of the overall architecture of the STRNet as shown in FIG. 2 are concatenated as shown in FIG. 4. PW Cony condenses this concatenated feature map, and dropout is applied to prevent overfitting. Finally, the transposed convolution restores the semantic mask (Dumoulin and Visin, 2016). To better understand transpose convolution, FIG. 5 depicts the schematic procedure of transpose convolution. For example, when the input and kernel size is [2×2] matrix, transpose convolution makes it [3×3] matrix. The stride is 1 in this example. Each element of the kernel multiplies about each element of the input feature map. The target unassigned [3×3] matrix is prepared, which simply adds the elements of the overlapping positions.

Figure 6:
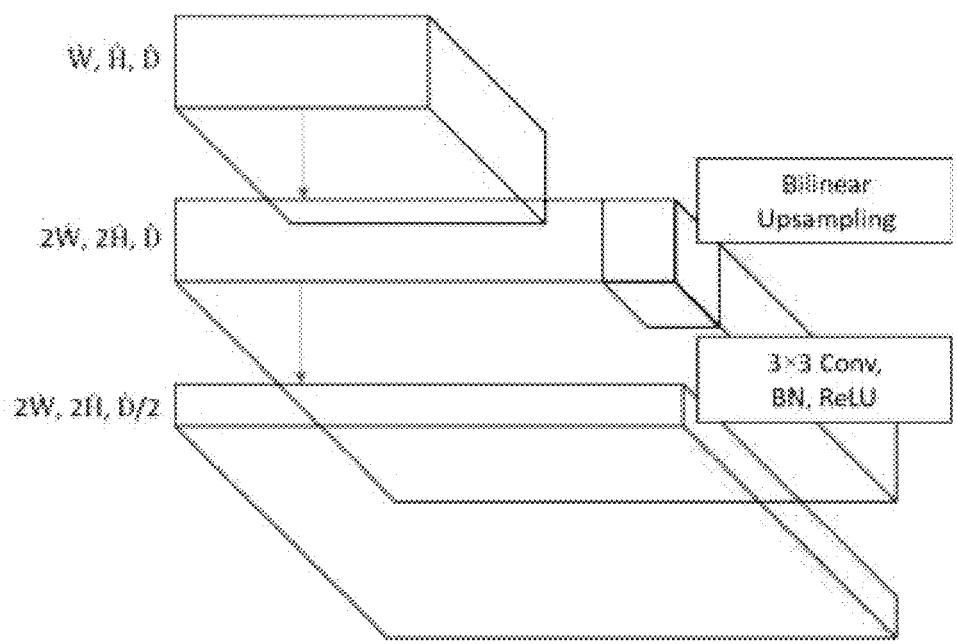
FIG. 6 shows an upsampling block or layer of STRNet.

The Upsampling layer is intended to double the dimensions of input, and it is commonly used in any segmentation network (Long et al., 2015; Ronneberger et al., 2015; Chen et al., 2018). As shown in FIG. 6, the input feature passes the bilinear upsampling. Bilinear upsampling increases width (Ŵ) and height (Ĥ) two times. After that, the 3×3 convolution, BN, and ReLU activation function are performed to reduce the depth of the map. The size of upsampling output follows the size of original input image.

Figure 7:
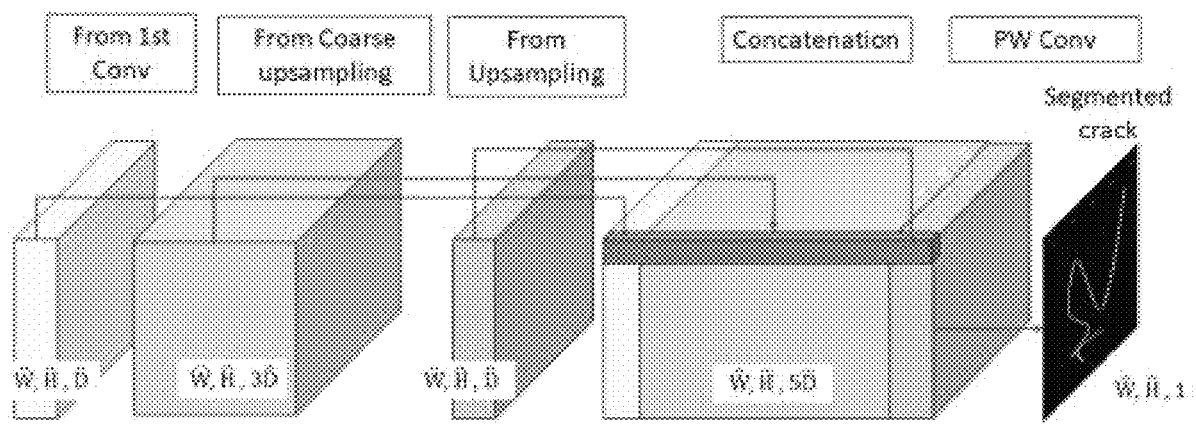
FIG. 7 shows a concatenation block or module of STR-Net.

Skip connection or simple bilinear upsampling has been widely used for encoder and decoder-based networks (Chen et al., 2018, Oktay et al., 2018) to keep multi-level features. The multiple skip connections were used to obtain better segmentation as shown in FIG. 7. As shown in FIG. 2, the results of the traditional Cony block, Attention decoder with Coarse upsampling, and Upsampling were concatenated. The Ŵ, Ĥ and D̂ are 1024, 512, and 16, respectively. The concatenated feature map is processed by PW convolution to have the same depth size compared to a binary ground truth.

To train the developed STRNet for crack segmentation on various complex scenes, ground truth data was prepared from various sources. A total of 1784 images sized 1024×512 and 1280×720 were prepared. Some (612) of them came from existing available datasets (Liu et al., 2019b; Özgenel, 2019). The raw images of these existing datasets were re-annotated to reduce annotation errors, as described hereinbefore. Some (300) of them came from previous studies (Choi & Cha, 2019; Kang et al., 2020), and new datasets (836) from various structures and locations was established. The detailed information of the developed datasets is presented in Table 3. To minimize the time and effort to prepare training image data, the inventors' early network SDDNet was used (Choi & Cha, 2019). The raw images were initially processed by this network and the output errors such as false positives and false negatives were fixed manually.

Figure 8:
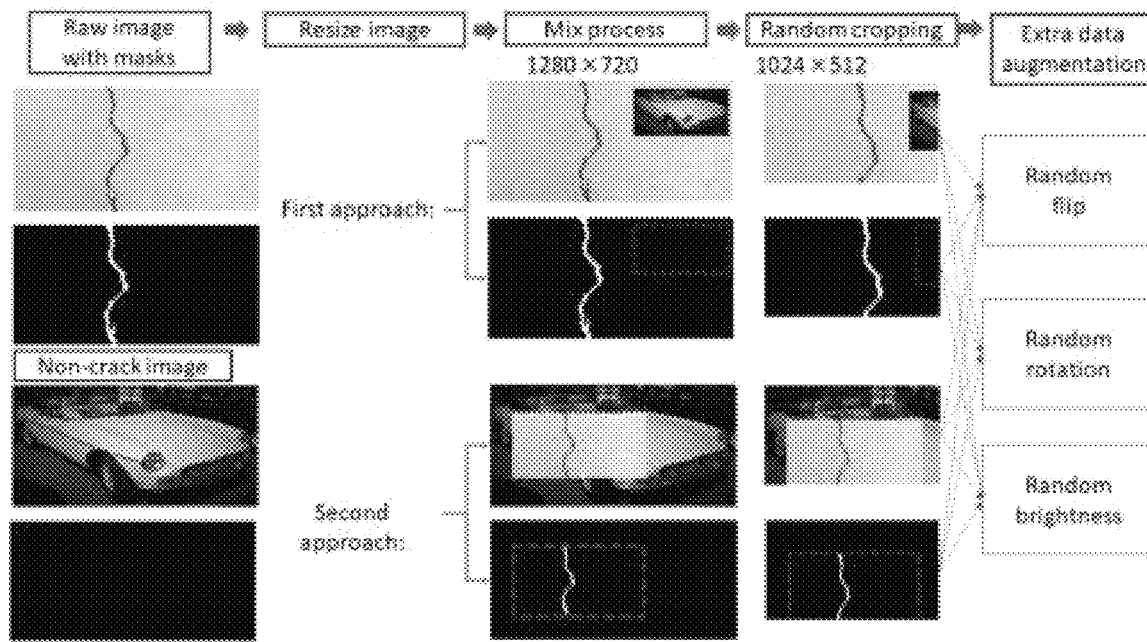
FIG. 8 shows two image synthesis approach for generating a training data set for STRNet.

The prepared ground truth data presented in Table 3 is not enough to achieve high performance segmentation which can negate the detection of any crack-like features on the complex scenes. Therefore, traditional data augmentation skills such as random rotation and random cropping were conducted. Moreover, synthesis techniques of ground truth images to generate cracks on complex scenes were also applied by inserting an object of interest into another non-target image with complex scenes that would allow us to achieve a robust classifier. FIG. 8 shows two approaches to generating the procedure and synthetic images.

The first approach is that the image with cracks is set as a background image, and a non-target image having complex scenes but without cracks is inserted in the background image as shown in FIG. 8. The second approach is vice versa. After, the synthesized images are further processed with random flipping, rotation, and brightness operations, and they are resized to 1024×512. The complex non-target images without cracks are collected from Open Image Dataset v4 (Kuznetsova et al., 2018). 1203 images from 99,999 images were selected for use. In order to crop the area having crack pixels in ground truth images, the "CropNonEmptyMaskIfExists" function from Albumentation (Buslaev et al., 2020) was used, and the cropped crack area was patched to a non-target complex background image as shown in FIG. 8. The cropped crack image size is randomly selected from 300×204 to 400×512, and the location of insertion is also randomly selected. Therefore, the eventual total number of augmented images for training is 12,030 as presented in Table 3.

The following describes the details of the training process and hardware. Python programing language (Python, 2020) with Pytorch 1.6 deep learning library (Paszke et al., 2017) was used to code the STRNet. The STRNet was trained in a graphic processing unit (GPU) equipped workstation. The workstation specifications are Intel Core i7-6850 K CPU, Titan XP GPU, and 128 GB RAM.

To train the models, the 4 Titan XP GPU was setup using Nvidia Apex distributed data parallel (DDP) training library. The input image size is 1024×512, which is randomly cropped if the image size is bigger than the input size. The use of proper loss function is crucial; therefore, several recently developed functions such as cross entropy loss, dice cross entropy loss, and mIoU were investigated. Eventually, focal-Tversky loss function was used for training. The focal-Tversky loss was used as a combination of the loss function (Abraham & Khan, 2019) as follows, $$TL = \frac{TP + S}{TP + FP * \alpha + FN * \beta + S} \quad (4)$$

$$Focal - Tversky \text{ loss} = (1 - TL)^\gamma \quad (5)$$

where TL is Tversky loss. TP, FP, and FN are true positive, false positive, and false negative, respectively. $\alpha$, $\beta$, $\gamma$, and S are all hyperparameters. Based on trial and error, $\alpha$, $\beta$, $\gamma$, and S are defined as 0.5, 0.5, 1.0, and 1.0, respectively. Abraham and Khan (2019) investigated the performance of this focal-Tversky loss function in the segmentation problem and showed that it outperformed to get balance between precision (FP) and recall (FN) compared to the dice loss function.

Figure 9:
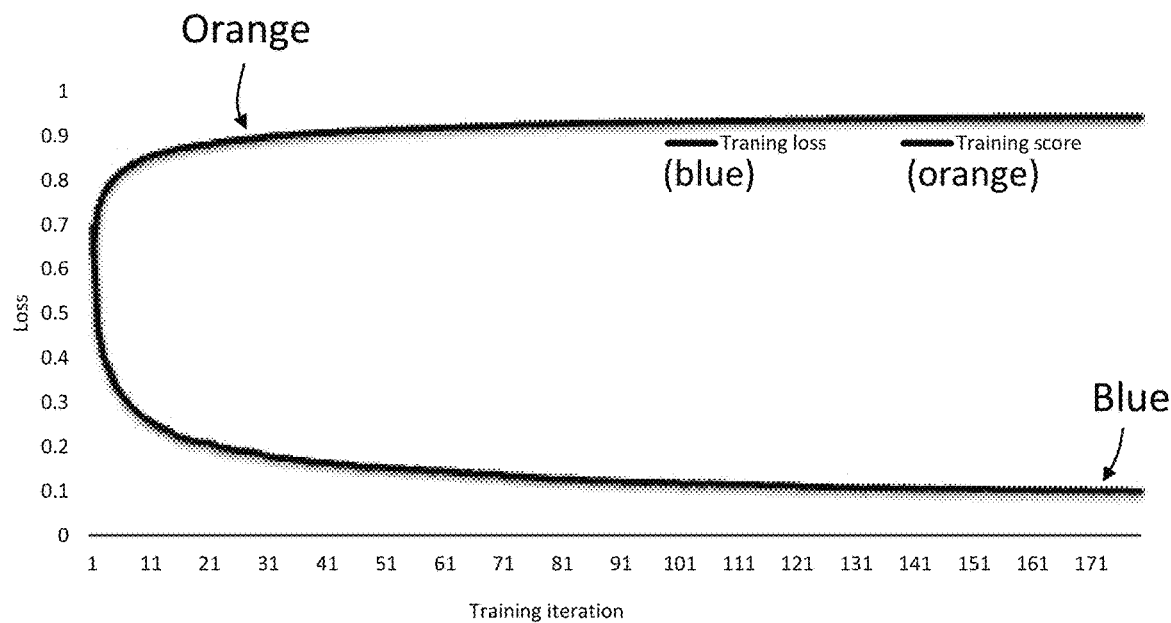
FIG. 9 is a graph of focal-Tversky training loss and training score as a function of training or epoch iteration.

In order to do backpropagation for the learnable parameter updating, the Adam optimizer was employed (Kingma & Ba 2014). The hyperparameters such as first moment, second moment, and dropout rate were defined as 0.9, 0.999 and 0.2, respectively. To reduce the training time, a DDP with batch size 8 was also used for four GPUs. The progress of the focal-Tversky loss through training epoch iteration is plotted in FIG. 9. As clearly demonstrated in FIG. 9, the focal-Tversky loss (lower curve, shown in blue) is successfully minimized, and training score (upper curve, shown in orange) also became almost 0.94.

The developed STRNet was extensively experimentally investigated. As will be described in further detail shortly, some parametric studies were carried out to find effective image synthesis technique, loss function, activation function, image synthesis technique, and effective decoder. The eventual STRNet based on the parametric studies was tested on many complex scenes to segment concrete cracks. Extensive comparative studies were conducted in the same training and testing datasets with the same conditions of loss function for fair evaluation.

We conducted parametric studies to find the most effective parameters and architecture of STRNet. In order to train and test the developed network, the training and testing data presented in Table 3 were used. All data augmentation techniques described hereinbefore were also applied. The used evaluation metrics are:

$$\text{Precision} = \frac{TP}{TP + FP} \quad (6)$$

$$\text{Recall} = \frac{TP}{TP + FN} \quad (7)$$

$$F1 \text{ score} = 2 \times \frac{\text{Precision} \times \text{Recall}}{\text{Precision} + \text{Recall}} \quad (8)$$

$$mIoU = \text{mean}\left(\frac{TP}{TP + FP + FN}\right) \quad (9)$$

The first study was for the method of image synthesis to overcome the limitation of prepared ground truth datasets. Two different image synthesis techniques described hereinbefore were compared, and the second image synthesis method showed better performances as presented in Table 4. This resulted in a 1.6% improvement. Two different loss functions for effective training of the STRNet were tested. The general IoU loss function, which is the most popular loss function in this field, and the focal-Tversky loss function were compared. The focal-Tversky loss function showed better performance, with a 6.7% improvement of mIoU. At this experimental test, the image synthesis was applied for both cases. The coarse upsampling technique was used in STRNet and tested the effectiveness. The coarse upsampling method improved the mIoU by approximately 1%. Another unique technique in this STRNet was the attention decoder. The effectiveness of the attention decoder was also investigated, which showed that it improved the mIoU by approximately 2.4%. With these parametric studies, the eventual network of the STRNet was determined with training methods such as image augmentation and loss function.

The eventual parameters and module from the experimental studies were selected for implementation in a preferred embodiment of STRNet. This STRNet showed a maximum 92.6% mIoU on 545 images having complex scenes with 49.2 FPS using single V100 GPU for 1024×512 input images. This is much faster than a prescribed speed (i.e., 30 FPS) for real-time processing. It provides very stable performance without unbalance among false positives and false negatives based on 91.7% precision and 92.7% recall evaluation metrics including 92.2% F1 score. The reported mIoU 92.6% is considered to be a very high level of accuracy since all the ground truth (GT) data has a minimum level of annotation error because there are many unclear cases that a pixel is included in a crack or intact concrete surface. Therefore, it seems that a maximum of 5% error is unavoidable in ground truth data.

Figure 10F:
FIGS. 10A through 10F show experimental results of STRNet applied to a plurality of images of cracks in complex scenes, each including (from left to right) a raw input image, ground truth (GT) data and an end result.
Figure 10F:
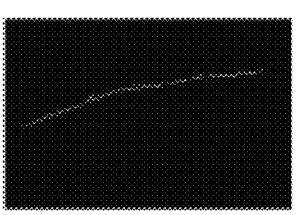
Figure 10F:
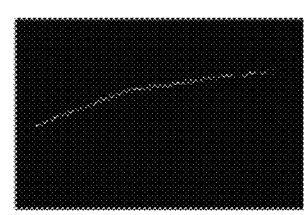
Figure 10E:
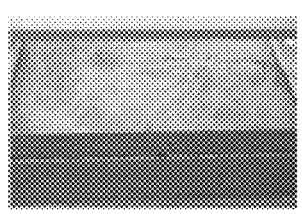
Figure 10E:
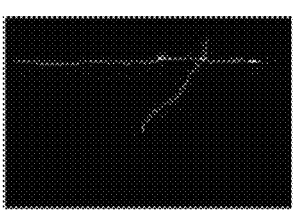
Figure 10E:
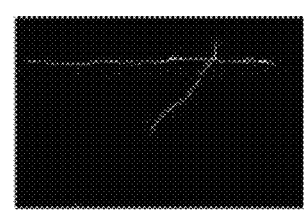
Figure 10D:
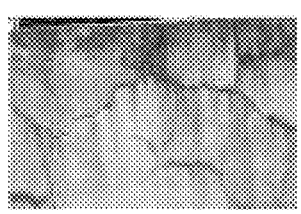
Figure 10D:
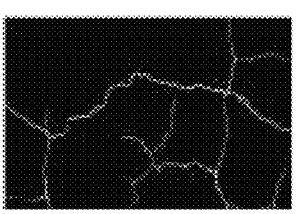
Figure 10D:
Figure 10C:
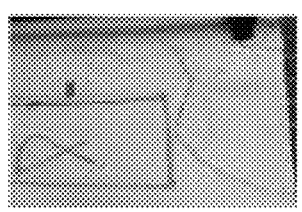
Figure 10C:
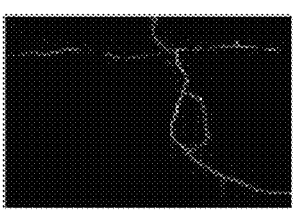
Figure 10C:
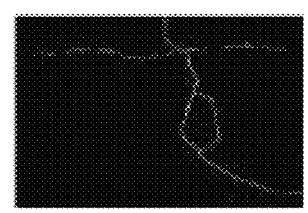
Figure 10B:
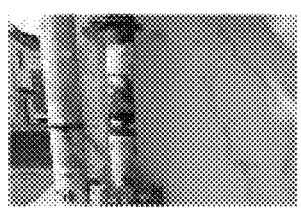
Figure 10B:
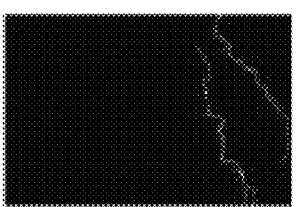
Figure 10B:
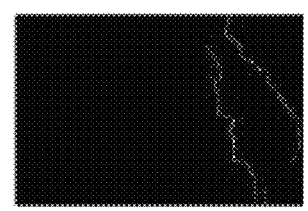
Figure 10A:
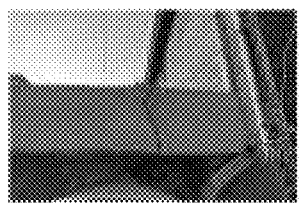
Figure 10A:
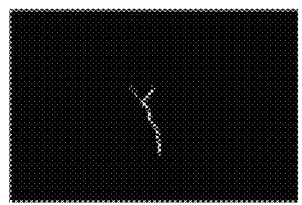
Figure 10A:
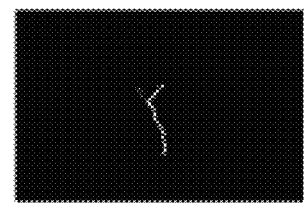

Some example results of the STRNet on complex scenes are illustrated in FIGS. 10A through 10F. Case 1 represented by FIG. 10A is related to the image having shadow, so cracks in the image are unclear to the naked eye, but the STRNet segmented cracks are very accurately based on the ground truth. Case 2 represented by FIG. 10B depicts a very thin crack with a blurry image. The image of Case 3 represented by FIG. 10C has water stains. Case 4 represented by FIG. 10D portrays crack-like features on concrete wall. Cases 5 & 6 represented by FIGS. 10E and 10F, respectively, are images with complex scenes. In each of these cases, the STRNet showed satisfactory results. The mIoU of Case 1-6 were 90.7%, 91.1%, 84.4%, 87.1%, 90.3% and 91.6%, respectively.

Extensive comparative studies were conducted to show the superior performances of the proposed STRNet compared to the traditional networks. The selected networks are attention U-net (König et al., 2019), Deeplab v3+(Ji et al., 2020), MobileNetV3 S16, and MoileNetV3 S8 (Howard et al., 2019). All these advanced networks are recently developed and showed state of the art performances in this segmentation area and applied them to the crack segmentation problem.

Each of these four selected networks were trained using the same training dataset, data augmentation techniques, and hyperparameters, including loss function for fair comparison. All of these well-trained networks were also tested by the same 545 testing images presented in Table 3. The experimental results are tabulated in Table 5. It showed that the proposed STRNet still demonstrated the best performances in terms of precision, recall, F1 score, and mIoU with the fastest processing with 49.2 FPS using single V100 GPU. The attention U-net, DeeplabV3+ showed unbalanced precision and recall scores, which means that these networks contain problems of false positive or false negative detections. MobileNetV3 S8 and S16 showed better performances in terms of false positives and false negatives with fastest processing speed 76.2 FPS and 71.0 FPS, but the overall accuracy of the segmentation is relatively lower than the other advanced networks with 85.9% mIoU.

In order to compare the performances visually, some examples of the selected advanced networks are shown in FIGS. 11A through 11F. The complex scene images in different locations and structures with different lighting conditions are selected and processed by four networks. Without arguably the proposed STRNet showed superior performances in these selected images. Deeplab V3+ showed worst performance, with around 9% lower performance in mIoU compared to the that of STRNet. The Deeplab V3+ demonstrated very weak performance in negating dark area to be detected as cracks as shown in FIG. 11-b). Attention U-net has problems with negating shadowed areas as shown in FIG. 11-c). MobileNetV3 S8 also showed weak performance with false positive detection of crack like features as shown in FIGS. 11B and 11C. As shown in FIG. 11E, only STRNet has been able to detect the thin crack successfully.

In this disclosure, a novel STRNet, which is a deep convolutional neural network, is developed for concrete crack segmentation in pixel-level. The developed network was trained using large training data set and tested on 545 images. The performances of the proposed network in terms of precision, recall, F1 score and mIoU are 91.7%, 92.7%, 92.2%, 92.6%, respectively, with 49.2 FPS using V100 GPU which is able to process relatively large input images (1280× 720, 1024×512) with real-time manner. From the extensive comparative studies, this demonstrated the best performance in terms of the upper four evaluation criteria. New technical contributions of this disclosure are:

1) A completely new deep convolutional neural network was designed to be able to do real-time processing using relatively large input images (1280×720, 1024×512) with 49.2 FPS.
2) The proposed network showed state of the art performance in segmentation of cracks with 92.6% mIoU.
3) The network was able to segment cracks on highly complex scenes including different area, structures, and lighting conditions.
4) The new encoder named as the STR module was developed to extract multi-level features effectively.
5) The new decoder with the attention module was developed to support the STR encoder by screening wrongly extracted features from the encoder to improve the segmentation accuracy (i.e., 2.4% mIoU).
6) Coarse upsampling was adopted for this crack segmentation problem. It improved the 1% mIoU.
7) The new loss function (Focal-Tversky loss function) was adopted to train the newly designed network to improve the crack segmentation performance (i.e., 6.7% mIoU).
8) Many training and testing data with large image sizes were established to conduct extensive evaluations (see Table 3).
9) The prepared ground truth data were drastically reduced in annotation errors compared to the publicly available crack segmentation data (see FIG. 1).
10) A new image synthesis technique was adopted to augment the ground truth training data to improve the network performance (i.e., 1% mIoU).
11) A learnable swish activation was adopted to improve the segmentation performance by keeping a concise network which enables faster than real-time processing. This may give us the possibility to increase the testing input size image.

The STRNet accomplished outstanding performance on the given testing and training datasets. Normally, a larger dataset is used in real-world application. The mixed precision training strategy can be tested for faster speed. However, the inventors' suggested algorithm should help this problem in the future.

As described hereinbefore, the present invention relates to a novel semantic trainable representation network (STRNet) developed particularly but not exclusively for crack segmentation in pixel-level in complex scenes in a real-time manner. The STRNet comprises a new attention-based encoder, attention-based decoder, coarse upsampling, focal-Tversky loss function, and a learnable swish activation function to provide a concise network with fast processing speed. The proposed network was trained with 1203 images with further extensive synthesis-based augmentation, and it was investigated with 545 testing images (1280×720, 1024×512) and showed 91.7%, 92.7% 92.2%, and 92.6% in terms of precision, recall, F1 score, and mIoU (mean intersection over union), respectively. The performances were compared to the recently developed advanced networks (Attention U-net, MobileNet v3, and Deeplab V3+), and the STRNet showed superior performance in these evaluation metrics with a faster processing speed of 49.2 frames per second.

STRNet improves performance in terms of mIoU by keeping the real-time network processing speed for a relatively large size of testing input image frame (1024×512) from Tesla V100 GPU. Also, a large ground truth dataset was established (i.e., 1748 RGB images with sizes of 1024×512, 1280×720) for training and testing purposes to consider complex background scenes for robust detection by avoiding overfitting to specific types of cracks and backgrounds scenes. Some of the publicly available datasets were used after fixing the severe errors. To improve the network's performance, Focal-Tversky loss function (Abraham & Khan, 2019) was used and adopted image synthesis techniques to augment the prepared ground truth training data to negate and detect crack-like features on complex scenes.

As described hereinbefore, there is disclosed a computer-implemented method for analyzing an image of a surface to detect a defect in the surface, which generally comprises the steps of:
  receiving the image of the surface having an initial size;
  processing the image using a machine learning algorithm configured to detect the defect, wherein the machine learning algorithm comprises a convolutional neural network;
  and displaying the image with location of the defect being indicated if determined to be present by the convolutional neural network;
  wherein the convolutional neural network comprises:
    an input module configured to receive the image, wherein the input module comprises at least one convolutional layer, batch normalization and a non-linear activation function;
    an encoder module after the input module and configured to extract features indicative of a present defect to form a feature map;
    a decoder module after the encoder module and configured to discard features from the feature map that are not associated with the present defect and to revert the feature map to a size matching the initial size of the image; and
    a concatenation module configured to link outputs of the input module, the encoder module and the decoder module for subsequent segmentation.

In the illustrated arrangement, the at least one convolutional layer comprises a preliminary convolutional layer configured to receive the image.

In the illustrated arrangement, the at least one convolutional layer comprises a plurality of consecutive convolutional layers configured to provide an output for batch normalization of the input module.

In the illustrated arrangement, the encoder module is repeatedly executed such that the output thereof is an output of multiple consecutive iterations of the encoder module.

In the illustrated arrangement, the decoder module comprises an attention-based decoder submodule configured to discard features from the feature map that are not associated with the present defect and an upsampling submodule thereafter configured to revert the feature map to a size matching the initial size of the image, wherein the attention-based decoder submodule is executed fewer than four times.

In the illustrated arrangement, the upsampling submodule is configured to perform coarse upsampling and fine upsampling in parallel, wherein fine upsampling and coarse upsampling are arranged to increase a size of the feature map by different multiplicative factors, wherein the multiplicative factor of coarse upsampling is greater than (i) the multiplicative factor of fine upsampling and (ii) two.

Typically, the multiplicative factor of fine upsampling is two.

In the illustrated arrangement, fine upsampling is repeated.

In the illustrated arrangement, coarse upsampling is performed once for every iteration of the upsampling module.

In the illustrated arrangement, the upsampling submodule of the decoder module additionally receives, as input, an output of the encoder module.

In the illustrated arrangement, the convolutional neural network further includes a max pooling module intermediate the encoder module and the decoder module.

There is also disclosed a computer-implemented method for extracting features from an image to detect an article of interest, which generally comprises the steps of:
  receiving the image after pre-processing thereof by at least one of (i) one or more consecutive convolutional operators, (ii) batch normalization and (iii) a nonlinear activation function;
  processing the pre-processed image by an encoder module to extract features representative of the article of interest, wherein the encoder module comprises a series of operations comprising pointwise convolutions, depthwise convolutions, batch normalizations, activation functions and squeeze-and-excitation-based attention operators;
  wherein the encoder module is iterated using different subsets of the series of operations, wherein each subset comprises selected ones of the operations.

In the illustrated arrangement, cumulative stride of pointwise and depthwise convolutions is less than 16.

In the illustrated arrangement, strides of pointwise and depthwise convolutions are no greater than two.

In the illustrated arrangement, the activation functions include nonlinear activation functions.

In the illustrated arrangement, the nonlinear activation functions comprise learnable Swish activation functions.

In the illustrated arrangement, the learnable Swish activation functions have a learnable parameter which is updated for every subsequent consecutive iteration of the encoder module during training.

Generally speaking, when the learnable parameter is updated, it is increased in magnitude.

In the illustrated arrangement, in every subsequent iteration, the learnable parameter is increased by an additive value, which initially is half of an initial value of the learnable parameter in an initial one of the iterations of the encoder module, and which is doubled for every subsequent iteration.

In the illustrated arrangement, the activation functions of one or more initial consecutive iterations of the encoder module comprise bilinear activation functions, and subsequent consecutive iterations, which are greater in number than the initial consecutive iterations, use nonlinear activation functions.

In the illustrated arrangement, the series of operations comprises:
  a first operation comprising a pointwise convolution, batch normalization thereafter and a prescribed bilinear activation function after the batch normalization;
  a second operation comprising a first depthwise convolution, batch normalization thereafter and the bilinear activation function after the batch normalization;
  a third operation which is the same as the first operation;
  a fourth operation comprising a second depthwise convolution and batch normalization thereafter, wherein the second depthwise convolution has a different stride than the first depthwise convolution;
  a fifth operation comprising global average pooling;
  a sixth operation comprising a linear function including a linear transpose and a rectified linear unit activation function thereafter;
  a seventh operation comprising a linear function including a linear transpose and a bi-linearity activation function thereafter;
  an eighth operation comprising a squeeze-and-excitation-based attention operator;
  a ninth operation comprising multiplication of an output after the fourth operation and an output after the eighth operation;
  a tenth operation comprising a linear activation function, at least one pointwise convolution thereafter;
  an eleventh operation comprising upsampling and concatenation thereafter; and
  a twelfth operation comprising a pointwise convolution and batch normalization thereafter.

In the illustrated arrangement, the at least one pointwise convolution of the tenth operation comprises a plurality of consecutive pointwise convolutions.

In the illustrated arrangement, a first subset of the series of operations comprises the third, fourth and tenth operations; a second subset of the series of operations comprises the third operation through the tenth operation; and a third subset of the series of operations comprises the first operation through the twelfth operation.

In the illustrated arrangement, the linear activation function of the operations of a plurality of initial iterations of the encoder module comprises a rectified linear unit activation function and the linear activation function of the operation of a plurality of subsequent iterations of the encoder module comprises a Swish activation function.

In the illustrated arrangement, an output of a final one of the iterations using the rectified linear unit activation function and an output of a final one of the iterations using the Swish activation function are extracted for use in further processing.

In the illustrated arrangement, the second subset of the series of operations is not consecutively repeated.

In the illustrated arrangement, the first subset of the series of operations is consecutively repeated.

In the illustrated arrangement, the stride of the depthwise convolutions is either one or two.

Furthermore, there is disclosed a computer-implemented method for processing a feature map of an image to detect an article of interest, which generally comprises a step of processing the feature map using a decoder module, wherein the decoder module comprises an attention-based decoder submodule configured to discard features from the feature map that are not associated with the present defect and an upsampling submodule thereafter configured to revert the feature map to a size matching an initial size of the image.

In the illustrated arrangement, the attention-based decoder submodule is iterated fewer than four times.

In the illustrated arrangement, the upsampling submodule is configured to perform coarse upsampling and fine upsampling in parallel, wherein fine upsampling and coarse upsampling are arranged to increase a size of the feature map by different multiplicative factors, wherein the multiplicative factor of coarse upsampling is greater than (i) the multiplicative factor of fine upsampling and (ii) two.

In the illustrated arrangement, fine upsampling is repeated.

In the illustrated arrangement, coarse upsampling is performed once.

In the illustrated arrangement, the upsampling submodule additionally receives the feature map as input.

In the illustrated arrangement, when the method further includes a step of receiving the feature map and an intermediate feature map product yielded by one or more initial iterations of an encoder module which is configured to process the image to form the feature map, the attention-based decoder submodule comprises:

a first operation comprising a convolution and batch normalization thereafter;

a second operation comprising parallel pointwise convolutions, only one of which is followed by batch normalization, whereby three intermediate maps are formed, wherein the intermediate maps are three-dimensional and wherein two of the intermediate maps are derived from the pointwise convolution followed by batch normalization;

a third operation configured to convert the three-dimensional intermediate maps to reduced maps having two dimensions, wherein the two intermediate maps derived from the pointwise convolution followed by batch normalization have transposed dimensions;

a fourth operation configured to (i) multiply the two intermediate maps derived from the pointwise convolution followed by batch normalization so as to form a first attention map, and (ii) filtering the first attention map with a softmax operator to form a second attention map; and a fifth operation configured to multiply the second attention map and the intermediate map derived from the pointwise convolution that is not followed by batch normalization so as to form an intermediate product.

Generally speaking, the convolution of the first operation has dimensions 3×3×D where D is a depth of the feature map.

In the illustrated arrangement, the attention-based decoder submodule further comprises:

a sixth operation configured to concatenate the intermediate product and the intermediate feature map product to form a concatenated product;

a seventh operation performed on the concatenated product and comprising a pointwise convolution and batch normalization thereafter; and wherein the seventh operation further comprises dropout after batch normalization.

In the illustrated arrangement, the attention-based decoder submodule further comprises an eighth operation comprising a transposed convolution.

In the illustrated arrangement, the transposed convolution has a stride of two.

The computer-implemented arrangements are performed by a system comprising at least one computer processor and a non-transitory readable storage medium having computer readable codes stored thereon which when executed by the at least one computer processor perform the steps of the aforementioned methods.

The scope of the claims should not be limited by the preferred embodiments set forth in the examples but should be given the broadest interpretation consistent with the specification as a whole.

REFERENCES

Abdel-Qader, I., Abudayyeh, O. and Kelly, M. E. (2003), Analysis of edge-detection techniques for crack identification in bridges. *Journal of Computing in Civil Engineering*, 17(4), 255-263.

Abraham, N., & Khan, N. M. (2019), A novel focal-Tversky loss function with improved attention U-net for lesion segmentation. In 2019 *IEEE 16th International Symposium on Biomedical Imaging* (ISBI 2019), 683-687.

Avenash, R. and Viswanath, P. (2019), Semantic Segmentation of Satellite Images using a Modified CNN with Hard-Swish Activation Function. In VISIGRAPP (VISAPP) 413-420.

Bang, S., Park, S., Kim, H. and Kim, H. (2019), Encoder-decoder network for pixel-level road crack detection in black-box images. *Computer Aided Civil and Infrastructure Engineering*, 34(8), 713-727.

Beckman, G. H., Polyzois, D. and Cha, Y. J. (2019), Deep learning-based automatic volumetric damage quantification using depth camera. *Automation in Construction*, 99, 114-124.

Buslaev, A., Iglovikov, V. I. Khvedchenya, E., Parinov, A., Druzhinin, M. and Kalinin, A. A., (2020), Albumentations: fast and flexible image augmentations. *Information*, 11(2), 125.

Benz, C., Debus, P., Ha, H. K. and Rodehorst, V. (2019), December. Crack Segmentation on UAS-based Imagery using Transfer Learning. In 2019 *International Conference on Image and Vision Computing New Zealand* (IVCNZ), 1-6.

Cha, Y. J., You, K. and Choi, W. (2016), Vision-based detection of loosened bolts using the Hough transform and support vector machines. *Automation in Construction*, 71, 181-188.

Cha, Y. J., Choi, W. and Büyüköztürk, O. (2017), Deep learning-based crack damage detection using convolutional neural networks. *Computer Aided Civil and Infrastructure Engineering*, 32(5), 361-378.

Cha, Y. J., Choi, W., Suh, G., Mahmoudkhani, S. and Büyüköztürk, O. (2018), Autonomous structural visual inspection using region-based deep learning for detecting multiple damage types. *Computer Aided Civil and Infrastructure Engineering*, 33(9), 731-747.

Chen, L. C., Zhu, Y., Papandreou, G., Schroff, F. and Adam, H. (2018), Encoder-decoder with atrous separable convolution for semantic image segmentation. *In Proceedings of the European conference on computer vision* (ECCV), 801-818.

Choi, W. and Cha, Y. J. (2019), SDDNet: Real-time crack segmentation. *IEEE Transactions on Industrial Electronics*, 67(9), 8016-8025.

Courbariaux, M., Bengio, Y. and David, J. P. (2015), Binaryconnect: Training deep neural networks with binary weights during propagations. *Advances in neural information processing systems*, 28, 3123-3131.

Deng, J., Lu, Y. and Lee, V. C. S. (2020), Concrete crack detection with handwriting script interferences using faster region-based convolutional neural network. *Computer Aided Civil and Infrastructure Engineering*, 35(4), 373-388.

Dumoulin, V. and Visin, F. (2016), A guide to convolution arithmetic for deep learning. *arXiv preprint*, arXiv: 1603.07285.

Dung, C. V., Anh Le Duc. (2019), Autonomous concrete crack detection using deep fully convolutional neural network. *Automation in Construction*, 99, 52-58.

He, K., Zhang, X., Ren, S., & Sun, J. (2016), Deep residual learning for image recognition. *In Proceedings of the IEEE conference on computer vision and pattern recognition*, 770-778.

Howard, A., Sandler, M., Chu, G., Chen, L. C., Chen, B., Tan, M., Wang, W., Zhu, Y., Pang, R., Vasudevan, V. and Le, Q. V. (2019), Searching for mobilenetv3. *IEEE International Conference on Computer Vision*, 1314-1324.

Hu, J., Shen, L., & Sun, G. (2018), Squeeze-and-excitation networks. *IEEE conference on computer vision and pattern recognition*, 7132-7141.

Huang, G., Liu, Z., Van Der Maaten, L. and Weinberger, K. Q. (2017), Densely connected convolutional networks. *IEEE conference on computer vision and pattern recognition,* 4700-4708.

Ioffe, S. and Szegedy, C. (2015), Batch normalization: Accelerating deep network training by reducing internal covariate shift. *arXiv preprint,* arXiv:1502.03167.

Ji, A., Xue, X., Wang, Y., Luo, X. and Xue, W. (2020), An integrated approach to automatic pixel-level crack detection and quantification of asphalt pavement. *Automation in Construction,* 114, 103176.

Kang, D. and Cha, Y. J. (2018), Autonomous UAVs for structural health monitoring using deep learning and an ultrasonic beacon system with geo-tagging. *Computer-Aided Civil and Infrastructure Engineering,* 33(10), 885-902.

Kang, D., Benipal, S. S., Gopal, D. L., & Cha, Y. J. (2020), Hybrid pixel-level concrete crack segmentation and quantification across complex backgrounds using deep learning. *Automation in Construction,* 118, 103291.

Kingma, D. P. and Ba, J. (2014), Adam: A method for stochastic optimization. *arXiv preprint,* arXiv:1412.6980.

Kuznetsova, A., Rom, H., Alldrin, N., Uijlings, J., Krasin, I., Pont-Tuset, J., Kamali, S., Popov, S., Malloci, M., Duerig, T. and Ferrari, V. (2018), The open images dataset v4: Unified image classification, object detection, and visual relationship detection at scale. *arXiv preprint,* arXiv:1811.00982.

König, J., Jenkins, M. D., Barrie, P., Mannion, M. and Morison, G. (2019), September. A convolutional neural network for pavement surface crack segmentation using residual connections and attention gating. In 2019 *IEEE International Conference on Image Processing (ICIP),* 1460-1464.

Liu, Z., Cao, Y., Wang, Y. and Wang, W. (2019a), Computer vision-based concrete crack detection using U-net fully convolutional networks. *Automation in Construction,* 104, 129-139.

Liu, Y., Yao, J., Lu, X., Xie, R. and Li, L. (2019b), DeepCrack: A deep hierarchical feature learning architecture for crack segmentation. *Neurocomputing,* 338, 139-153.

Long, J., Shelhamer, E. and Darrell, T. (2015), Fully convolutional networks for semantic segmentation. *IEEE conference on computer vision and pattern recognition,* 3431-3440.

Maeda, H., Sekimoto, Y., Seto, T., Kashiyama, T. and Omata, H. (2018), Road damage detection and classification using deep neural networks with smartphone images. *Computer Aided Civil and Infrastructure Engineering,* 33(12), 1127-1141.

Mei, Q., Gül, M. and Azim, M. R. (2020), Densely connected deep neural network considering connectivity of pixels for automatic crack detection. *Automation in Construction,* 110, 103018.

Nair, V. and Hinton, G. E. (2010), Rectified linear units improve restricted boltzmann machines. *International Conference on Machine Learning* (ICML), 807-814.

Oktay, O., Schlemper, J., Folgoc, L. L., Lee, M., Heinrich, M., Misawa, K., Mori, K., McDonagh, S., Hammerla, N. Y., Kainz, B. and Glocker, B. (2018), Attention U-net: Learning where to look for the pancreas. *arXiv preprint,* arXiv:1804.03999.

Özgenel, çağar, Firat. (2019), "Concrete Crack Segmentation Dataset", Mendeley Data, v1 http://dx.doi.org/10.17632/wsn7tfbrp.1.1

Paszke, A., Gross, S., Chintala, S., Chanan, G., Yang, E., DeVito, Z., Lin, Z., Desmaison, A., Antiga, L. and Lerer, A. (2017), Automatic differentiation in pytorch, *Neural Information Processing Systems (NIPS) Workshop paper,* 8.

Python 3.6.12. (2020), Python: Retrieved from https://www.python.org/Ramachandran, P., Zoph, B. and Le, Q. V. (2017), Searching for activation functions. *arXiv preprint,* arXiv:1710.05941.

Ren, Y., Huang, J., Hong, Z., Lu, W., Yin, J., Zou, L. and Shen, X. (2020), Image-based concrete crack detection in tunnels using deep fully convolutional networks. *Construction and Building Materials,* 234, 117367.

Ronneberger, O., Fischer, P. and Brox, T. (2015), October. U-net: Convolutional networks for biomedical image segmentation. *In International Conference on Medical image computing and computer-assisted intervention,* 234-241.

Sun, K., Zhao, Y., Jiang, B., Cheng, T., Xiao, B., Liu, D., Mu, Y., Wang, X., Liu, W. and Wang, J. (2019), High-resolution representations for labeling pixels and regions. *arXiv preprint,* arXiv:1904.04514.

Vaswani, A., Shazeer, N., Parmar, N., Uszkoreit, J., Jones, L., Gomez, A. N., Kaiser, L. and Polosukhin, I. (2017), Attention is all you need. In Advances in neural information processing systems, 5998-6008.

Xue, Y. and Li, Y. (2018), A fast detection method via region-based fully convolutional neural networks for shield tunnel lining defects. *Computer Aided Civil and Infrastructure Engineering,* 33(8), 638-654.

Yuan, Y. and Wang, J. (2018), Ocnet: Object context network for scene parsing. *arXiv preprint,* arXiv:1809.00916.

Zhang, A., Wang, K. C., Li, B., Yang, E., Dai, X., Peng, Y., Fei, Y., Liu, Y., Li, J. Q. and Chen, C. (2017), Automated pixel-level pavement crack detection on 3D asphalt surfaces using a deep-learning network. *Computer Aided Civil and Infrastructure Engineering,* 32(10), 805-819.

Zeng, Z., Xie, W., Zhang, Y. and Lu, Y. (2019), RIC-Unet: An improved neural network based on Unet for nuclei segmentation in histology images. *IEEE Access,* 7, 21420-21428.

Tables

TABLE 1

| | | Crack segmentation networks | | | | | | |
|---|---|---|---|---|---|---|---|---|
| Author | Complex scenes | Network | Train | Val | Test | F1 Score | mIoU | Test input size | FPS |
| Liu et al., 2019a | No | Unet | 38 | 19 | 27 | 90.0 | | 512 × 512 | 8 |
| Dung & Anh, 2019 | No | FCN | 400 | 100 | 100 | 89.3 | | 227 × 227 | 13.8 |

TABLE 1-continued

Crack segmentation networks

| Author | Complex scenes | Network | Train | Val | Test | F1 Score | mIoU | Test input size | FPS |
|---|---|---|---|---|---|---|---|---|---|
| Liu et al., 2019b | No | Deep Crack | 300 | | 237 | 86.5 | 85.9 | 544 × 384 | 10 |
| König et al., 2019 | No | Attention_Unet | 95 | | 60 | 92.8 | | 48 × 48 | — |
| Bang et al., 2019 | Yes | Resnet 150 | 427 | | 100 | | 59.7 | 1920 × 1080 | 0.22 |
| Choi & Cha, 2019 | Yes | SDDNet | 160 | | 40 | | 84.6 | 1024 × 512 | 36 |
| Benz et al., 2019 | No | Crack NausNet | 1303 | 487 | 115 | 82.9 | | 512 × 512 | — |
| Mei et al., 2020 | No | Dense Net | 700 | 100 | 200 | 75.4 | | 256 × 256 | 0.25 |
| Ji et al., 2020 | No | Deeplab_v3+ | 300 | 50 | 80 | | 73.3 | 512 × 512 | — |
| Ren et al., 2020 | No | Crack SegNet | 307 | | 102 | 74.6 | 59.1 | 512 × 512 | 11 |

TABLE 2

Detailed hyperparameter for STR module
STR module iteration

| Repeat # | DW | α | β | S1 | S2 | Connector | f(x) | config |
|---|---|---|---|---|---|---|---|---|
| 1 | 3 × 3 × 1 | 1D | 1D | 2 | 1 | no | ReLU | 2 |
| 2 | 3 × 3 × 1 | 4.5D | 1D | 1 | 1 | no | ReLU | 1 |
| 3 | 3 × 3 × 1 | 5.5D | 1.5D | 1 | 1 | yes (Upsampling) | ReLU | 1 |
| 4 | 5 × 5 × 1 | 6D | 2.5D | 2 | 1 | no | Swish | 2 |
| 5 | 5 × 5 × 1 | 15D | 2.5D | 1 | 2 | no | Swish | 3 |
| 6 | 5 × 5 × 1 | 15D | 2.5D | 1 | 2 | no | Swish | 3 |
| 7 | 5 × 5 × 1 | 7.5D | 3D | 1 | 1 | no | Swish | 2 |
| 8 | 5 × 5 × 1 | 9D | 3D | 1 | 2 | no | Swish | 3 |
| 9 | 5 × 5 × 1 | 18D | 6D | 2 | 1 | no | Swish | 2 |
| 10 | 5 × 5 × 1 | 36D | 6D | 1 | 2 | no | Swish | 3 |
| 11 | 5 × 5 × 1 | 36D | 6D | 1 | 2 | yes (Attention decoder) | Swish | 3 |

TABLE 3

Developed datasets for training and testing

| | Training | Testing | Total |
|---|---|---|---|
| Size | 1,024 × 512 | 1,280 × 720, 1,024 × 512 | 1,280 × 720, 1,024 × 512 |
| Number of images | 1,203 | 545 | 1,748 |
| Number of augmented images | 12,030 | | |

TABLE 4

Parametric studies for STRNet

| | Precision | Recall | F-1 score | mIoU |
|---|---|---|---|---|
| Without image synthesis | 89.9% | 90.8% | 90.4% | 91.0% |
| IoU loss function | 81.0% | 87.5% | 84.1% | 85.9% |
| Focal-Tversky loss function | 91.7% | 92.7% | 92.2% | 92.6% |
| Without coarse upsampling | 90.3% | 92.0% | 91.1% | 91.6% |
| Without attention in decoder | 89.9% | 89.0% | 89.5% | 90.2% |

TABLE 5

Results of experimental comparative studies

| Model | Precision (%) | Recall (%) | F1 Score (%) | mIoU (%) | Titan XP (FPS) | V100 (FPS) |
|---|---|---|---|---|---|---|
| Attention U-net | 85.63 | 91.22 | 88.33 | 89.1 | 11.0 | 17 |
| DeeplabV3+ | 77.37 | 83.6 | 80.36 | 83.24 | 17.1 | 30.2 |
| MobileNetV3 S8 | 82.9 | 85.4 | 84.13 | 85.9 | 41.6 | 76.2 |
| MobileNetV3 S16 | 86.33 | 84.89 | 85.61 | 87.1 | 31.1 | 71.0 |
| STRNet | 91.7 | 92.7 | 92.2 | 92.6 | 27.0 | 49.2 |

The invention claimed is:

1. A computer-implemented method for analyzing an image to detect an article of interest, comprising:
   receiving the image having an initial size;
   processing the image using a machine learning algorithm configured to detect the article of interest, wherein the machine learning algorithm comprises a convolutional neural network;
   and modifying a display of the image to include an indication of a location of the article of interest when determined to be present by the convolutional neural network;
   wherein the convolutional neural network comprises:
      an input module configured to receive the image, wherein the input module comprises at least one convolutional layer, batch normalization and a non-linear activation function;
      an encoder module after the input module and configured to extract features indicative of a present article of interest to form a feature map;
      a decoder module after the encoder module and configured to discard features from the feature map that are not associated with the present article of interest and to revert the feature map to a size matching the initial size of the image; and
      a concatenation module configured to link outputs of the input module, the encoder module and the decoder module for subsequent segmentation;
      the encoder module being iterated using a plurality of different operation configurations in which each operation configuration comprises a series of operations selected from a list including pointwise convolutions, depthwise convolutions, batch normalizations, activation functions and squeeze-and-excitation-based attention operators, in which the activation functions of the encoder module include learnable Swish activation functions; and
      the encoder module being iterated such that each different operation configuration is repeated irregularly.

2. The computer-implemented method of claim 1 wherein the at least one convolutional layer comprises a plurality of consecutive convolutional layers configured to provide an output for batch normalization of the input module.

3. The computer-implemented method of claim 1 wherein the encoder module is repeatedly executed such that the output thereof is an output of multiple consecutive iterations of the encoder module.

4. The computer-implemented method of claim 1 wherein the decoder module comprises an attention-based decoder submodule configured to discard features from the feature map that are not associated with the present article of interest and an upsampling submodule thereafter configured to revert the feature map to a size matching the initial size of the image, wherein the attention-based decoder submodule is executed fewer than four times.

5. The computer-implemented method of claim 1 wherein the learnable Swish activation functions have a learnable parameter which is updated for every subsequent consecutive iteration of the encoder module during training.

6. The computer-implemented method of claim 5 wherein, in every subsequent iteration, the learnable parameter is increased by an additive value, which initially is half of an initial value of the learnable parameter in an initial one of the iterations of the encoder module, and which is doubled for every subsequent iteration.

7. The computer-implemented method of claim 1 wherein the series of operations comprises:
   a first operation comprising a pointwise convolution, batch normalization thereafter and a prescribed bilinear activation function after the batch normalization;
   a second operation comprising a first depthwise convolution, batch normalization thereafter and the bilinear activation function after the batch normalization;
   a third operation which is the same as the first operation;
   a fourth operation comprising a second depthwise convolution and batch normalization thereafter, wherein the second depthwise convolution has a different stride than the first depthwise convolution;
   a fifth operation comprising global average pooling;
   a sixth operation comprising a linear function including a linear transpose and a rectified linear unit activation function thereafter;
   a seventh operation comprising a linear function including a linear transpose and a bi-linearity activation function thereafter;
   an eighth operation comprising a squeeze-and-excitation-based attention operator;
   a ninth operation comprising multiplication of an output after the fourth operation and an output after the eighth operation;
   a tenth operation comprising a linear activation function, at least one pointwise convolution thereafter;
   an eleventh operation comprising upsampling and concatenation thereafter; and
   a twelfth operation comprising a pointwise convolution and batch normalization thereafter.

8. The computer-implemented method of claim 7 wherein the at least one pointwise convolution of the tenth operation comprises a plurality of consecutive pointwise convolutions.

9. The computer-implemented method of claim 7 wherein a first operation configuration of the series of operations comprises the third, fourth and tenth operations; a second operation configuration of the series of operations comprises the third operation through the tenth operation; and a third operation configuration of the series of operations comprises the first operation through the twelfth operation.

10. The computer-implemented method of claim 9 wherein the linear activation function of the operations of a plurality of initial iterations of the encoder module comprises a rectified linear unit activation function and the linear activation function of the operation of a plurality of subsequent iterations of the encoder module comprises a Swish activation function.

11. The computer-implemented method of claim 9 wherein an output of a final one of the iterations using the rectified linear unit activation function and an output of a final one of the iterations using the Swish activation function are extracted for use in further processing.

12. The computer-implemented method of claim 9 wherein the second operation configuration of the series of operations is not consecutively repeated.

13. The computer-implemented method of claim 9 wherein the operation configuration subset of the series of operations is consecutively repeated.

14. A computer-implemented method for analyzing an image to detect an article of interest, comprising:
   receiving the image having an initial size;
   processing the image using a machine learning algorithm configured to detect the article of interest, wherein the machine learning algorithm comprises a convolutional neural network; and
   modifying a display of the image to include indication of a location of the article of interest when determined to be present by the convolutional neural network;

wherein the convolutional neural network comprises:
  an input module configured to receive the image, wherein the input module comprises at least one convolutional layer, batch normalization and a nonlinear activation function;
  an encoder module after the input module and configured to extract features indicative of a present article of interest to form a feature map;
  a decoder module after the encoder module and configured to discard features from the feature map that are not associated with the present article of interest and to revert the feature map to a size matching the initial size of the image; and
  a concatenation module configured to link outputs of the input module, the encoder module and the decoder module for subsequent segmentation;
wherein the decoder module comprises an attention-based decoder submodule configured to discard features from the feature map that are not associated with the present article of interest and an upsampling submodule thereafter configured to revert the feature map to a size matching the initial size of the image;
wherein the attention-based decoder submodule is executed fewer than four times; and
wherein the upsampling submodule is configured to perform coarse upsampling and fine upsampling in parallel, wherein fine upsampling and coarse upsampling are arranged to increase a size of the feature map by different multiplicative factors, wherein the multiplicative factor of coarse upsampling is greater than (i) the multiplicative factor of fine upsampling and (ii) two.

15. The computer-implemented method of claim 14 wherein fine upsampling is repeated.

16. The computer-implemented method of claim 14 wherein coarse upsampling is performed once for every iteration of the upsampling module.

17. The computer-implemented method of claim 14 wherein the upsampling submodule of the decoder module additionally receives, as input, an output of the encoder module.

18. A computer-implemented method for analyzing an image to detect an article of interest, comprising:
  receiving the image having an initial size;
  processing the image using a machine learning algorithm configured to detect the article of interest, wherein the machine learning algorithm comprises a convolutional neural network; and
  modifying a display of the image to include indication of a location of the article of interest when determined to be present by the convolutional neural network;
  wherein the convolutional neural network comprises:
    an input module configured to receive the image, wherein the input module comprises at least one convolutional layer, batch normalization and a nonlinear activation function;
    an encoder module after the input module and configured to extract features indicative of a present article of interest to form a feature map;
    a decoder module after the encoder module and configured to discard features from the feature map that are not associated with the present article of interest and to revert the feature map to a size matching the initial size of the image; and
    a concatenation module configured to link outputs of the input module, the encoder module and the decoder module for subsequent segmentation;
  wherein the decoder module comprises an attention-based decoder submodule configured to discard features from the feature map that are not associated with the present article of interest and an upsampling submodule thereafter configured to revert the feature map to a size matching the initial size of the image;
  wherein the attention-based decoder submodule is executed fewer than four times; and
  wherein the attention-based decoder submodule comprises:
    a first operation comprising a convolution and batch normalization thereafter;
    a second operation comprising parallel pointwise convolutions, only one of which is followed by batch normalization, whereby three intermediate maps are formed, wherein the intermediate maps are three-dimensional and wherein two of the intermediate maps are derived from the pointwise convolution followed by batch normalization;
    a third operation configured to convert the three-dimensional intermediate maps to reduced maps having two dimensions, wherein the two intermediate maps derived from the pointwise convolution followed by batch normalization have transposed dimensions;
    a fourth operation configured to (i) multiply the two intermediate maps derived from the pointwise convolution followed by batch normalization so as to form a first attention map, and (ii) filtering the first attention map with a softmax operator to form a second attention map; and
    a fifth operation configured to multiply the second attention map and the intermediate map derived from the pointwise convolution that is not followed by batch normalization so as to form an intermediate product.

19. The computer-implemented method of claim 18 wherein the attention-based decoder submodule further comprises:
  a sixth operation configured to concatenate the intermediate product and the intermediate feature map product to form a concatenated product;
  a seventh operation performed on the concatenated product and comprising a pointwise convolution and batch normalization thereafter; and
  wherein the seventh operation further comprises dropout after batch normalization.

20. The computer-implemented method of claim 19 wherein the attention-based decoder submodule further comprises an eighth operation comprising a transposed convolution.

21. A computer-implemented method for analyzing an image to detect an article of interest, comprising:
  receiving the image having an initial size;
  processing the image using a machine learning algorithm configured to detect the article of interest, wherein the machine learning algorithm comprises a convolutional neural network;
  and modifying a display of the image to include an indication of a location of the article of interest when determined to be present by the convolutional neural network;
  wherein the convolutional neural network comprises:
    an input module configured to receive the image, wherein the input module comprises at least one convolutional layer, batch normalization and a nonlinear activation function;

an encoder module after the input module and configured to extract features indicative of a present article of interest to form a feature map;

a decoder module after the encoder module and configured to discard features from the feature map that are not associated with the present article of interest and to revert the feature map to a size matching the initial size of the image; and a concatenation module configured to link outputs of the input module, the encoder module and the decoder module for subsequent segmentation:

wherein the encoder module comprises a series of operations comprising pointwise convolutions, depthwise convolutions, batch normalizations, activation functions and squeeze-and-excitation-based attention operators, wherein the encoder module is iterated using different subsets of the series of operations, wherein each subset comprises selected ones of the operations; and wherein the activation functions of one or more initial consecutive iterations of the encoder module comprise bilinear activation functions, and subsequent consecutive iterations, which are greater in number than the initial consecutive iterations, use nonlinear activation functions.

* * * * *